US008774286B2

(12) United States Patent
Yokokawa et al.

(10) Patent No.: US 8,774,286 B2
(45) Date of Patent: Jul. 8, 2014

(54) RECEIVING APPARATUS AND METHOD, PROGRAM, AND RECEIVING SYSTEM

(75) Inventors: Takashi Yokokawa, Kanagawa (JP); Satoshi Okada, Tokyo (JP)

(73) Assignee: Sony Corporation, Tokyo (JP)

( * ) Notice: Subject to any disclaimer, the term of this patent is extended or adjusted under 35 U.S.C. 154(b) by 464 days.

(21) Appl. No.: 12/851,796

(22) Filed: Aug. 6, 2010

(65) Prior Publication Data

US 2011/0037904 A1 Feb. 17, 2011

(30) Foreign Application Priority Data

Aug. 14, 2009 (JP) ............................. P2009-187946

(51) Int. Cl.
*H04N 5/44* (2011.01)
*H04L 27/00* (2006.01)

(52) U.S. Cl.
USPC ...... 375/240.28; 375/316; 375/265; 375/295; 375/232; 375/340; 375/240.26; 375/320; 375/298

(58) Field of Classification Search
CPC .................. H04N 19/00533; H04N 21/44209; H04N 21/44004; H04L 27/2601
USPC ................ 375/240.28, 240.26, E07.026, 316; 370/474, 412, 328; 709/249
IPC .................. H04N 7/12; H04J 3/24; H04H 1/00
See application file for complete search history.

(56) References Cited

U.S. PATENT DOCUMENTS

| | | | |
|---|---|---|---|
| 5,768,539 A * | 6/1998 | Metz et al. ..................... | 709/249 |
| 7,334,132 B1 | 2/2008 | Kumar et al. | |
| 7,486,680 B1 | 2/2009 | Zhang et al. | |
| 2004/0218633 A1* | 11/2004 | Burzynski ...................... | 370/474 |
| 2008/0022345 A1* | 1/2008 | Kim et al. ...................... | 725/131 |
| 2008/0144820 A1* | 6/2008 | Hong ............................. | 380/212 |
| 2009/0196217 A1* | 8/2009 | Himmanen et al. .......... | 370/328 |
| 2010/0189122 A1* | 7/2010 | Dandekar et al. ............. | 370/412 |
| 2010/0284472 A1* | 11/2010 | Liao et al. ................ | 375/240.26 |

FOREIGN PATENT DOCUMENTS

| | | |
|---|---|---|
| JP | 2001-111565 A | 4/2001 |
| JP | 2006-164333 A | 6/2006 |
| WO | WO 2009 095526 | 8/2009 |

OTHER PUBLICATIONS

"Frame Structure Channel Coding and Modulation for a Second Generation Digital Terrestrial Television Broadcasting System (DVB-T2)", DVB Document A122 Jun. 2008.
Japanese Office Action issued Oct. 8, 2013 in Patent Application No. 2009-187946.

* cited by examiner

*Primary Examiner* — Thao X Le
*Assistant Examiner* — Long Le
(74) *Attorney, Agent, or Firm* — Oblon, Spivak, McClelland, Maier & Neustadt, L.L.P.

(57) ABSTRACT

A receiving apparatus includes a buffer configured to store packets of a first packet sequence made up of packets extracted from one transport stream that are common to packets of another transport stream and packets of a second packet sequence made up of common packets, a read control section configured to read the packets of the first packet sequence and the second packet sequence stored in the buffer after the passing of a predetermined time after synchronization is established between the packets of the first packet sequence and the packets of the second packet sequence, thereby reconstructing one transport stream from the first packet sequence and the second packet sequence, and an output section configured to output the reconstructed transport stream.

9 Claims, 18 Drawing Sheets

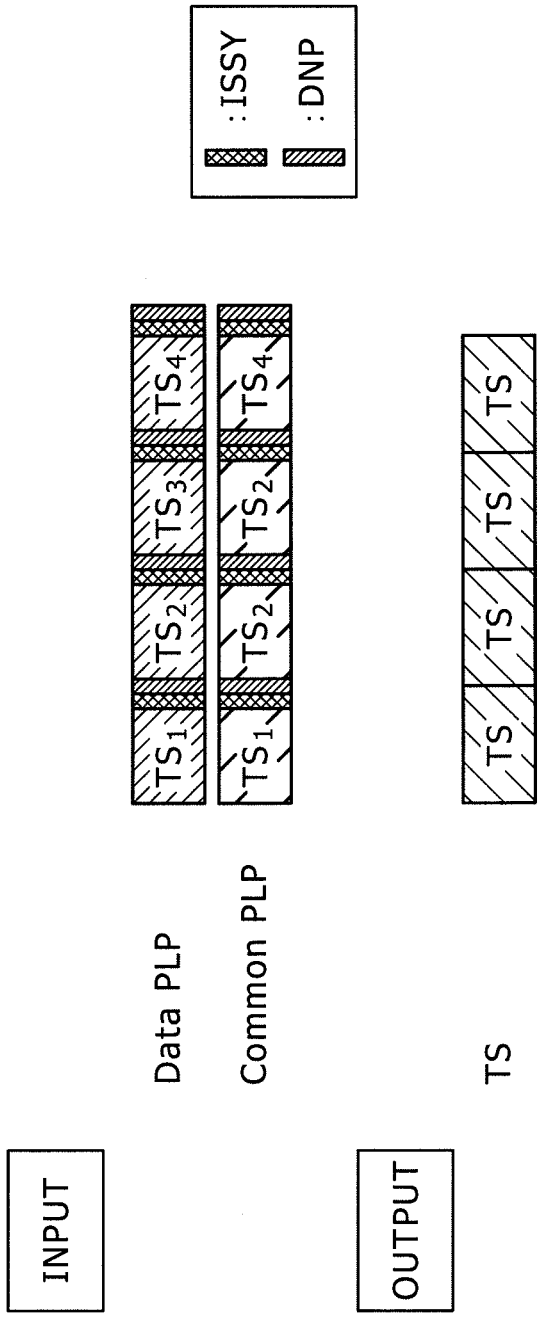

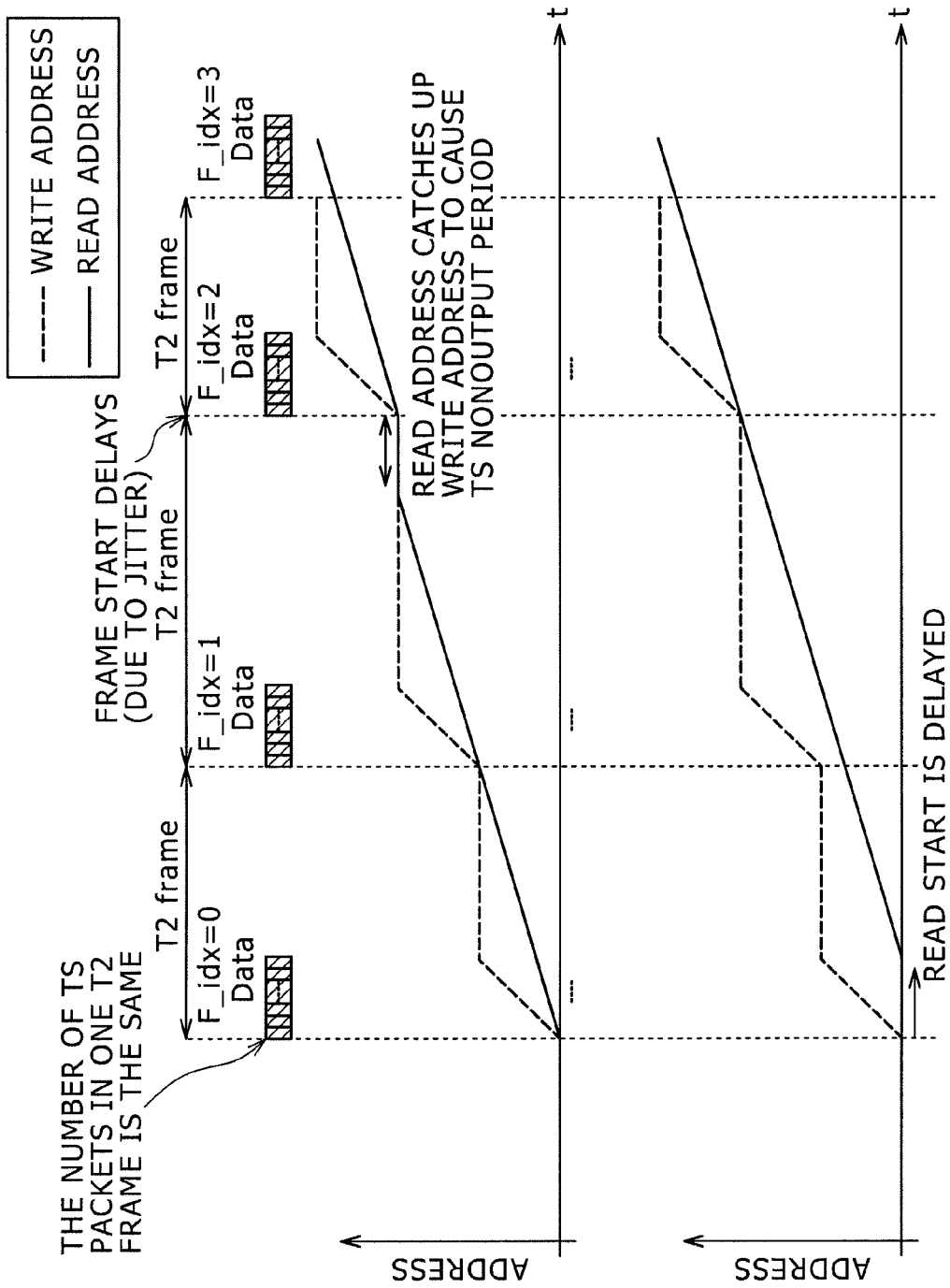
F I G. 12A
F I G. 12B

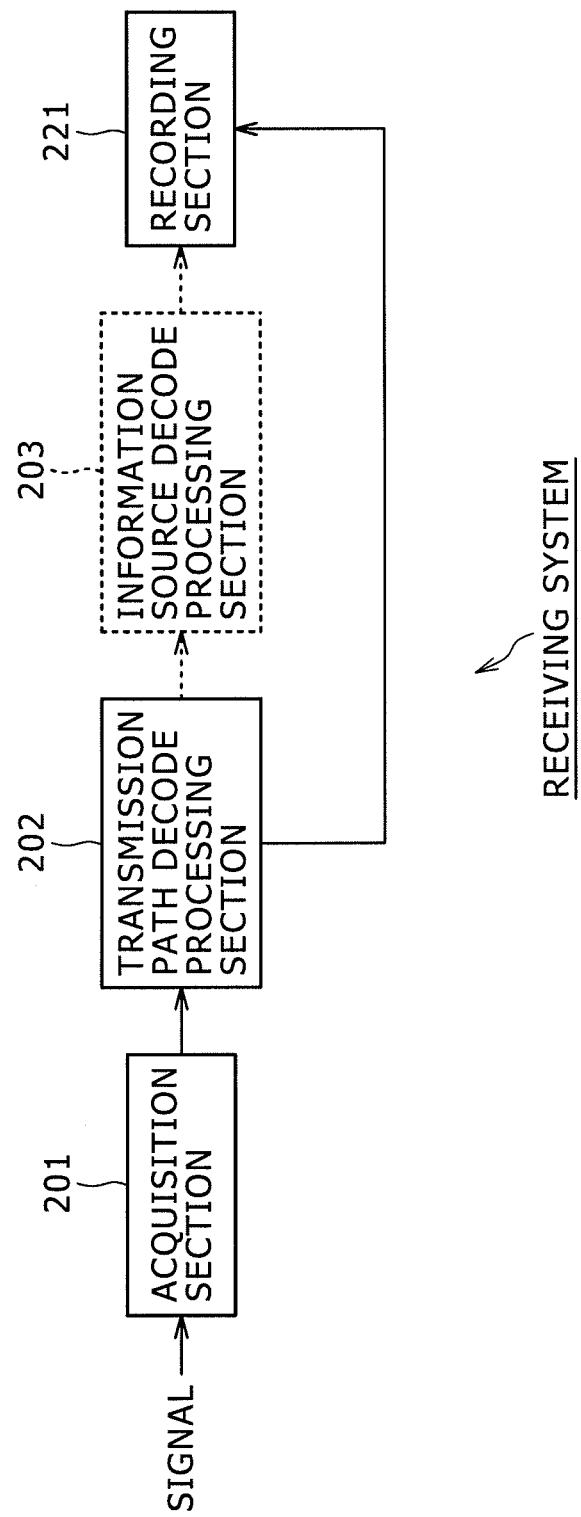

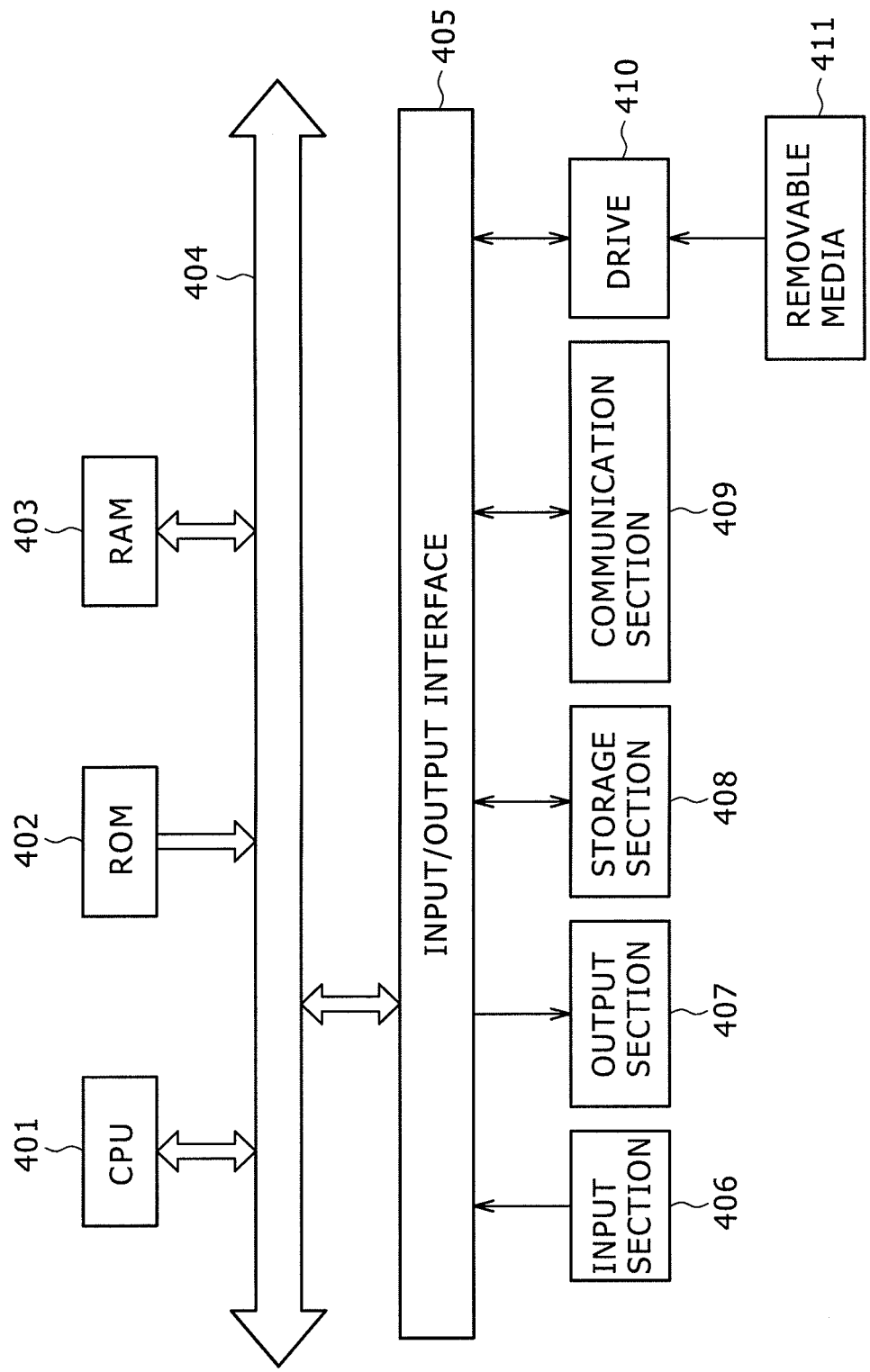

US 8,774,286 B2

RECEIVING APPARATUS AND METHOD, PROGRAM, AND RECEIVING SYSTEM

BACKGROUND OF THE INVENTION

1. Field of the Invention

The present invention relates to a receiving apparatus and method, a program, and a receiving method and, more particularly, to a receiving apparatus and method, a program, and a receiving system that are configured to prevent a period of time in which transport streams are not outputted.

2. Description of the Related Art

In recent years, a modulation scheme called OFDM (Orthogonal Frequency Division Multiplexing) is in use for a digital signal transmission scheme. In this OFDM scheme, many orthogonal subcarriers are prepared in a transmission band and data is allocated to the amplitude and phase of each subcarrier, thereby executing digital modulation on the basis of PSK (Phase Shift Keying) or QAM (Quadrature Amplitude Modulation) on these subcarriers.

The OFDM scheme is often applied to the terrestrial digital broadcasting that is heavily affected by multipath interference. The terrestrial digital broadcasting based on the OFDM scheme includes the standards, such as DVB-T (Digital Video Broadcasting-Terrestrial) and ISDB-T (Integrated Services Digital Broadcasting-Terrestrial).

Meantime, DVB (Digital Video Broadcasting)-T.2 is being established by ETSI (European Telecommunication Standard Institute) as a next-generation terrestrial digital broadcasting that is disclosed in DVB BlueBook A122 Rev. 1, Frame structure channel coding and modulation for a second-generation digital terrestrial television broadcasting system (DVB-T2), Sep. 1, 2008, DVB home page, searched Aug. 5, 2009, URL http://www.dvb.org/technology/standards/, hereinafter referred to as Non-patent Document 1.

SUMMARY OF THE INVENTION

The DVB-T.2 standard uses a scheme called M-PLP (Multiple Physical Layer Pipe). In this M-PLP scheme, data transmission is executed by a packet sequence called common PLP (Physical Layer Pipe) with common packets extracted from two or more transport streams (hereafter referred to as TS) and a packet sequence called data PLP with common packets extracted. Then the receiving side reconstructs one TS from the common PLP and the data PLP.

It should be noted here that the receiving side reconstructs a TS by synchronizing the common PLP with the data PLP and outputs the reconstructed TS; however, if the timing of this output is too early, the reconstructed TS is all outputted before a next frame is reached, thereby making it possible to cause a non-output period during a TS output period.

If a TS non-output period occurs, the decoding by a subsequent decoder may fail. Therefore, a TS non-output period must be prevented from occurring.

Therefore, the present invention addresses the above-identified and other problems associated with related-art methods and apparatuses and solves the addressed problems by providing a receiving apparatus and method, a program, and a receiving system that are configured to prevent a TS non-output period from occurring, thereby providing a secure decoding operation.

In carrying out the invention and according to a first embodiment thereof, there is provided a receiving apparatus. This receiving apparatus has a buffer configured to store packets of a first packet sequence made up of packets extracted from one TS that are common to packets of another TS and packets of a second packet sequence made up of common packets; read control means for reading the packets of the first packet sequence and the second packet sequence stored in the buffer after the passing of a predetermined time after synchronization is established between the packets of the first packet sequence and the packets of the second packet sequence, thereby reconstructing one TS from the first packet sequence and the second packet sequence; and output means for outputting the reconstructed TS.

In the above-mentioned receiving apparatus, the first packet sequence and the second packet sequence are a common PLP and a data PLP generated from a plurality of TSs by an M-PLP in DVB-T.2.

In the above-mentioned receiving apparatus, after the passing of a delay time obtained from information associated with an FEF (Future Extension Frame) having a structure different from a T2 frame that is a unit in which data is transmitted on the basis of DVB-T.2, the control means starts reading packets from the buffer, thereby reconstructing the TS.

In the above-mentioned receiving apparatus, after the passing of a delay time obtained from TTO (Time To Output) indicative of a time from the beginning of a P1 symbol arranged in a T2 frame that is a unit in which data is transmitted on the basis of DVB-T.2 to the outputting of a predetermined packet, the read control means starts reading packets from the buffer, thereby reconstructing the TS.

In carrying out the invention and according to the first embodiment of the invention, there is provided a receiving method for a receiving apparatus having a buffer for storing packets of a first packet sequence made up of packets extracted from one TS that are common to packets of another TS and packets of a second packet sequence made up of common packets. This receiving method has the steps of: reading packets of the first packet sequence and the second packet sequence from the buffer after the passing of a predetermined delay time after synchronization between the packets, thereby reconstructing one TS from the first packet sequence and the second packet sequence; and outputting the reconstructed TS.

In carrying out the invention and according to the first embodiment thereof, there is provided a program. This program is configured to make a computer for controlling a device having a buffer for storing packets of a first packet sequence made up of packets extracted from one TS that are common to packets of another TS and packets of a second packet sequence made up of common packets executing the steps of: reading packets of the first packet sequence and the second packet sequence from the buffer after the passing of a predetermined delay time after synchronization between the packets, thereby reconstructing one TS from the first packet sequence and the second packet sequence; and outputting the reconstructed TS.

In the first embodiment of the invention, packets of a first packet sequence made up of packets extracted from one TS that are common to packets of another TS and packets of a second packet sequence made up of common packets are stored in a buffer, the first packet sequence and the second packet sequence stored in the buffer read after the passing of a predetermined delay time after synchronization between the packets of these packet sequences, one TS is reconstructed from these packet sequences, and the reconstructed TS is outputted.

In carrying out the invention and according to a second embodiment thereof, there is provided a receiving system. This receiving system has acquisition means for acquiring a signal via a transmission path; and a transmission path decode processing section configured to execute transmission path decode processing at least including demodulation processing on a signal acquired via the transmission path. This transmission path decode processing section has a buffer configured to store packets of a first packet sequence made up of packets extracted from one TS that are common to packets of another TS and packets of a second packet sequence made up of common packets; read control means for reading the packets of the first packet sequence and the second packet sequence stored in the buffer after the passing of a predetermined time after synchronization is established between the packets of the first packet sequence and the packets of the second packet sequence, thereby reconstructing one TS from the first packet sequence and the second packet sequence; and output means for outputting the reconstructed TS.

In carrying out the invention and according to a third embodiment thereof, there is provided a receiving system. This receiving system has a transmission path decode processing section configured to execute transmission path decode processing at least including demodulation processing on a signal acquired via a transmission path; and an information source decode processing section configured to execute information source decode processing at least including processing of decompressing compressed information on the signal on which the transmission path decode processing has been executed. This transmission path decode processing section has a buffer configured to store packets of a first packet sequence made up of packets extracted from one TS that are common to packets of another TS and packets of a second packet sequence made up of common packets; read control means for reading the packets of the first packet sequence and the second packet sequence stored in the buffer after the passing of a predetermined time after synchronization is established between the packets of the first packet sequence and the packets of the second packet sequence, thereby reconstructing one TS from the first packet sequence and the second packet sequence; and output means for outputting the reconstructed TS.

In carrying out the invention and according to a fourth embodiment thereof, there is provided a receiving system. This receiving system has a transmission path decode processing section configured to execute transmission path decode processing at least including demodulation processing on a signal acquired via a transmission path; and an output section configured to output at least one of image data and audio data on the basis of the signal on which the transmission path decode processing has been executed. This transmission path decode processing section has a buffer configured to store packets of a first packet sequence made up of packets extracted from one TS that are common to packets of another TS and packets of a second packet sequence made up of common packets; read control means for reading the packets of the first packet sequence and the second packet sequence stored in the buffer after the passing of a predetermined time after synchronization is established between the packets of the first packet sequence and the packets of the second packet sequence, thereby reconstructing one TS from the first packet sequence and the second packet sequence; and output means for outputting the reconstructed TS.

In carrying out the invention and according to a fifth embodiment thereof, there is provided a receiving system. This receiving system has a transmission path decode processing section configured to execute transmission path decode processing at least including demodulation processing on a signal acquired via a transmission path; and a recording block configured to record the signal on which the transmission path decode processing has been executed. This transmission path decode processing section has a buffer configured to store packets of a first packet sequence made up of packets extracted from one TS that are common to packets of another TS and packets of a second packet sequence made up of common packets; read control means for reading the packets of the first packet sequence and the second packet sequence stored in the buffer after the passing of a predetermined time after synchronization is established between the packets of the first packet sequence and the packets of the second packet sequence, thereby reconstructing one TS from the first packet sequence and the second packet sequence; and output means for outputting the reconstructed TS.

In the second through fifth embodiments of the invention, packets of a first packet sequence made up of packets extracted from one TS that are common to packets of another TS and packets of a second packet sequence made up of common packets are stored in a buffer, the first packet sequence and the second packet sequence stored in the buffer read after the passing of a predetermined delay time after synchronization between the packets of these packet sequences, one TS is reconstructed from these packet sequences, and the reconstructed TS is outputted.

The above-mentioned receiving apparatus may be an independent unit or a component block making up one unit.

The above-mentioned program may be provided by transmission via a transmission medium or by recording to a recording medium.

As described and according to the invention, decoding can be executed without fail.

BRIEF DESCRIPTION OF THE DRAWINGS

FIG. 9 is a diagram for describing details of the TS reconstruction method on the receiving side;

FIG. 12A and FIG. 12B are timing charts indicative of a first prevention method for preventing a TS non-output period;

FIG. 17 is a block diagram illustrating a configuration example of a receiving system practiced as a third embodiment of the invention; and FIG. 18 is a block diagram illustrating an example of hardware configuration of a computer.

DETAILED DESCRIPTION OF THE PREFERRED EMBODIMENTS

This invention will be described in further detail by way of embodiments thereof with reference to the accompanying drawings.

[Overview of the Entire Configuration]

Figure 1:
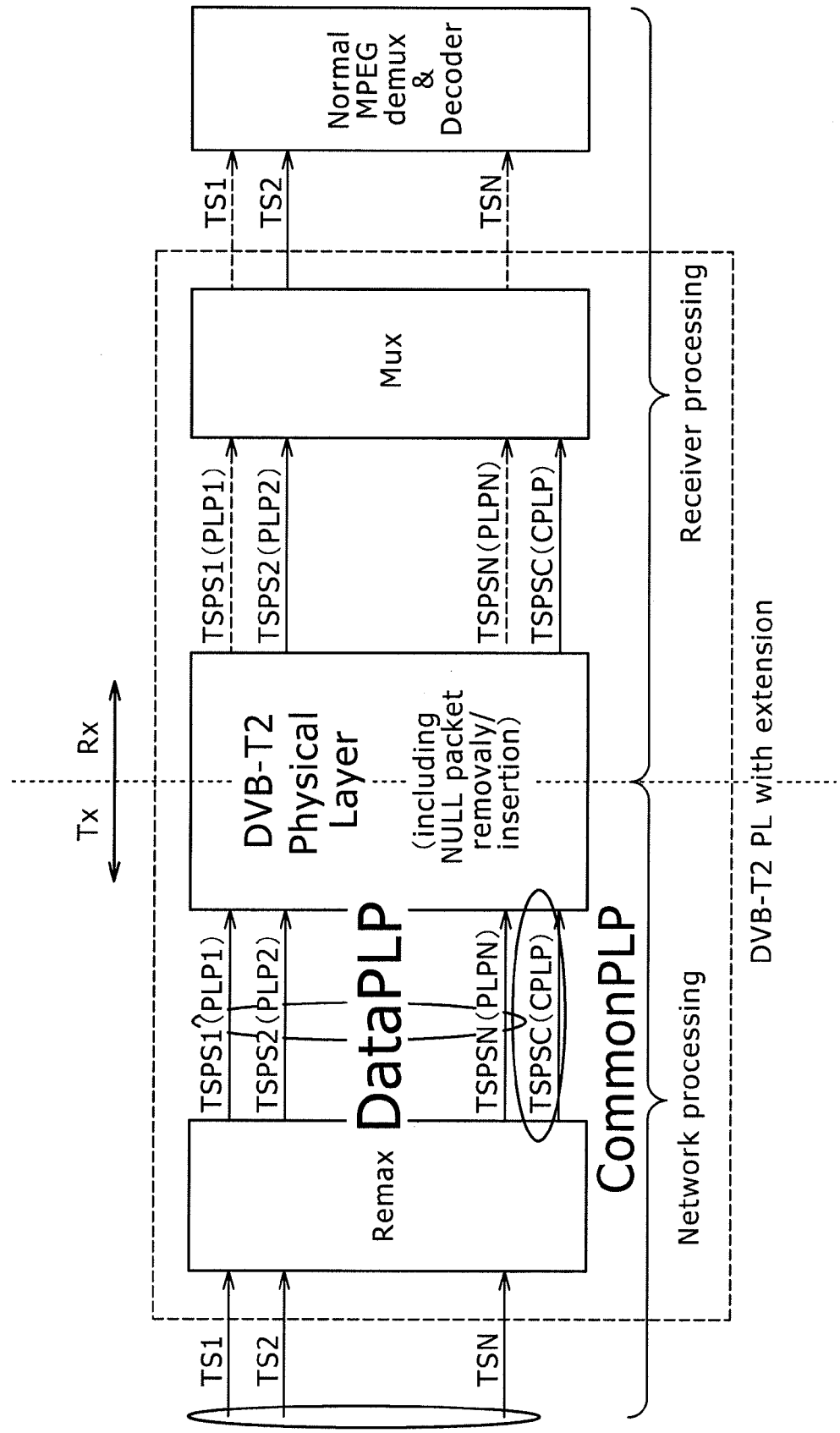
FIG. 1 is a diagram illustrating an outline of a configuration example of a transmitter and a receiver based on M-PLP in DVB-T.2.

FIG. 1 is a diagram showing an overview of a configuration example of a transmitter (Tx) and a receiver (Rx) in the case where the M-PLP scheme is used in DVB-T.2.

As shown in FIG. 1, when two or more TSs (TS1 trough TSN in the figure) are entered at a constant bit rate, the transmitter side extracts common packets from the packets making up these TSs to generate a packet sequence (TSPSC (CPLP) in the figure) called a common PLP. In addition, the TSs from which the common packets have been extracted provides packet sequences (TSPS1 (PLP1) through TSPSN (PLPN)).

To be more specific, on the transmitter side, N data PLPs and one common PLP are generated from N TSs. Consequently, for each PLP, an error correction coding ratio and the modulation scheme of OFDM or the like can be allocated in an adaptive manner. It should be noted that, in the present embodiment, term "PLP" denotes both the common PLP and the data PLP. It should also be noted that terms "common PLP" and "data PLP" denote each packet making up each of these PLPs.

For example, in the case of TS (Transport Stream) packets based on MPEG, two or more data PLPs (TSPS1 (PLP1) through TSPSN (PLPN) in the figure) include the same information, such as control information like SDT (Service Description Table) and EIT (Event Information Table), so that, extracting and transmitting such common information as the common PLP can prevent the transmission efficiency from lowering.

On the other hand, the receiver side demodulates the received two or more data PLPs (TSPS1 (PLP1) through TSPSN (PLPN) in the figure) and the received common PLP (TSPSC (CPLP) in the figure) by the modulating such as OFDM for example and then extracts only a desired PLP (TSPS2 (PLP2) in the figure) to execute error correction processing, thereby reconstructing a desired TS.

For example, as shown in FIG. 1, if TSPS2 (PLP2) has been selected from among TSPS1 (PLP1) through TSPSN (PLPN), TS2 is reconstructed by use of TSP2 (PLP2) as data PLP and TSPSC (CPLP) as common PLP. Thus, extracting one data PLP and one common PLP allows the reconstruction of a TS, thereby providing a merit of enhancing the operation efficiency of the receiving.

Next, the TS reconstructed on the receiver side is outputted to a following decoder. This decoder MPEG-decodes the encoded data included in the TS and outputs resultant image and audio data.

As described above, in the case where the M-PLP scheme is used in DVB-T.2, the transmitter side (Tx) generates N data PLPs and one common PLP from N TSs and transmits the generated data PLPs and common PLP and the receiver side (Rx) reconstructs (or re-generates) a desired TS from a desired data PLP and one common PLP.

[Configuration Example of the Receiving Apparatus]

Figure 2:
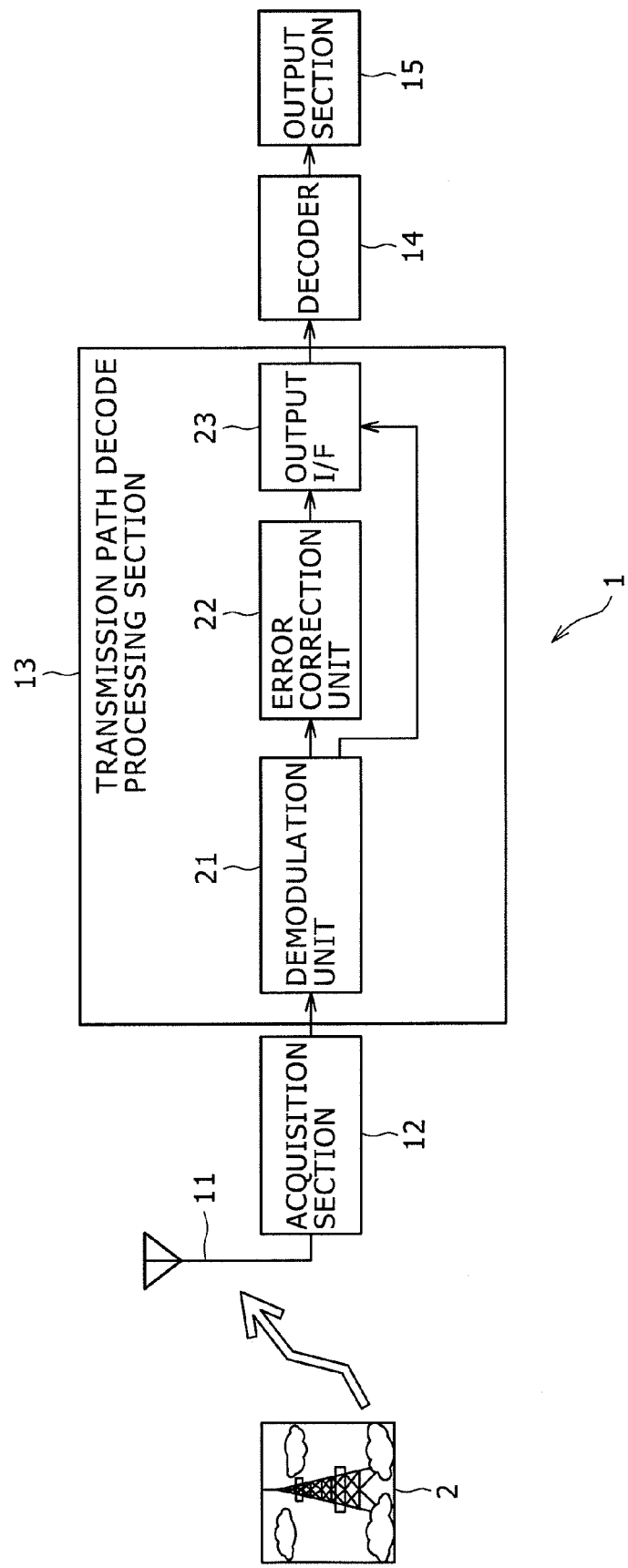
FIG. 2 is a block diagram illustrating a configuration example of a receiving apparatus practiced as one embodiment of the invention.

FIG. 2 is a diagram showing a configuration example of a receiving apparatus practiced as one embodiment of the invention.

It should be noted that, with reference to FIG. 2, a receiving apparatus 1 is equivalent to the receiver (Rx) shown in FIG. 1 and a transmitting apparatus 2 is equivalent to the transmitter (Tx) in FIG. 1.

The receiving apparatus 1 shown in FIG. 2 receives a digital broadcasting signal transmitted from the transmitting apparatus 2. This signal provides an OFDM signal that is obtained by executing processing, such as error correction and OFDM modulation, on the PLP generated from a TS by means of the M-PLP scheme employed by DVB-T.2 being established as a next-generation terrestrial digital broadcasting standard.

To be more specific, the transmitting apparatus 2, such as a broadcasting station for example, is transmitting OFDM signals of digital broadcasting via a transmission path. The receiving apparatus 1 receives the OFDM signals from the transmitting apparatus 2, executes transmission path decode processing including demodulation and error correction on the received OFDM signals, and outputs the resultant decoded data to the following processing stage.

In the example shown in FIG. 2, the receiving apparatus 1 is configured by an antenna 11, an acquisition section 12, a transmission path decode processing section 13, a decoder 14, and an output section 15.

The antenna 11 receives an OFDM signal transmitted from the transmitting apparatus 2 via a transmission path and supplies the received OFDM signal to the acquisition section 12.

The acquisition section 12, configured by an STB (Set Top Box) for example, frequency-converts the OFDM signal (or the RF (radio frequency) signal) received by the antenna 11 into an IF (Intermediate Frequency) signal, supplying the IF signal to the transmission path decode processing section 13.

The transmission path decode processing section 13 executes the necessary processing, such as demodulation and error correction, on the OFDM signal supplied from the acquisition section 12 to reconstruct the TS from the resultant PLP and supplies the reconstructed TS to the decoder 14.

Namely, the transmission path decode processing section 13 is configured by a demodulation unit 21, an error correction unit 22, and an output I/F (Interface) 23.

The demodulation unit 21 demodulates the OFDM signal supplied from the acquisition section 12 and outputs a desired data PLP and one common PLP to the error correction unit 22 as resultant demodulated signals. In addition, the demodulation unit 21 obtains information associated with FEF (Future Extension Frame) obtained by the demodulation processing and information for use in computing a delay time (hereafter referred to as delay time computation information) to be described later, such as N_TI and etc, supplying the obtained information to the output I/F 23.

It should be noted that FEF denotes a frame having a structure different from the T2 frame that is the unit in which data is transmitted in DVB-T.2. This structure will be determined in the future. For the information associated with this FEF, FEF_Length indicative of the length of FEF and FEF_Interval indicative of an FEF arrangement interval are obtained. N_TI denotes information indicative of the number of time interleaves in the T2 frame.

To be more specific, the T2 frame and the FEF each have a preamble signal called a P1. This preamble signal contains information for determining whether a subject frame is a T2 frame or an FEF and information necessary for the processing of an OFDM signal such as demodulation. Also, a T2 frame contains a preamble signal called P2. This P2 contains the FEF information such as FEF-length and FEF_Interval in addition to the information necessary for the demodulation of a T2 frame.

Therefore, if a T2 frame and an FEF are multiplexed with each other, the demodulation unit 21 detects the P2 from the T2 frame to obtain FEF information contained in this P2 and supplies the obtained FEF signal to the output I/F 23 as delay time computation information. In addition, the demodulation unit 21 obtains N_TI from the preamble signal and supplies the T_TI to the output I/F 23 as delay time computation information.

The error correction unit 22 executes predetermined error correction processing on the PLP that is a modulated signal obtained from the demodulation unit 21 and outputs the resultant PLP to the output I/F 23.

It should be noted that the transmitting apparatus 2 encodes data, such as program image and audio data for example, by MPEG (Moving Picture Experts Group) and transmits a PLP generated from the TS made up of TS packets including this MPEG encoded data as an OFDM signal.

In addition, the transmitting apparatus 2 encodes the PLP into an RS (Reed-Solomon) code or an LDPC (Low Density Parity Check) code as measures against errors that occur on transmission paths. Therefore, the error correction unit 22 executes the processing of decoding these codes as error correction processing.

The output I/F 23 reconstructs the TS from the PLP supplied from the error correction unit 22 and outputs the reconstructed TS to the outside at a predetermined rate (hereafter referred to as a TS rate).

To be more specific, on the basis of the delay time computation information supplied from the demodulation unit 21 and the PLP supplied from the error correction unit 22, the output I/F 23 obtains a predetermined delay time between the synchronization between common PLP and data PLP and the beginning of the TS reconstruction. Next, the output I/F 23 does not start the TS reconstruction immediately after the synchronization between common PLP and data PLP, but reconstructs the TS after the passing of the predetermined delay time, supplying the reconstructed TS to the decoder 14 in accordance with the TS rate. Details of the configuration of the output I/F 23 will be described later with reference to FIG. 3.

The decoder 14 MPEG-decodes the encoded data contained in the TS supplied from the output I/F 23 and supplies the resultant image and audio data to the output section 15.

The output section 15, configured by a display monitor and a loudspeaker for example, displays images and outputs sound in accordance with the image and audio data supplied from the decoder 14.

As described above, the receiving apparatus 1 is configured.

[Detailed Configuration Example of the Output I/F]

Figure 3:
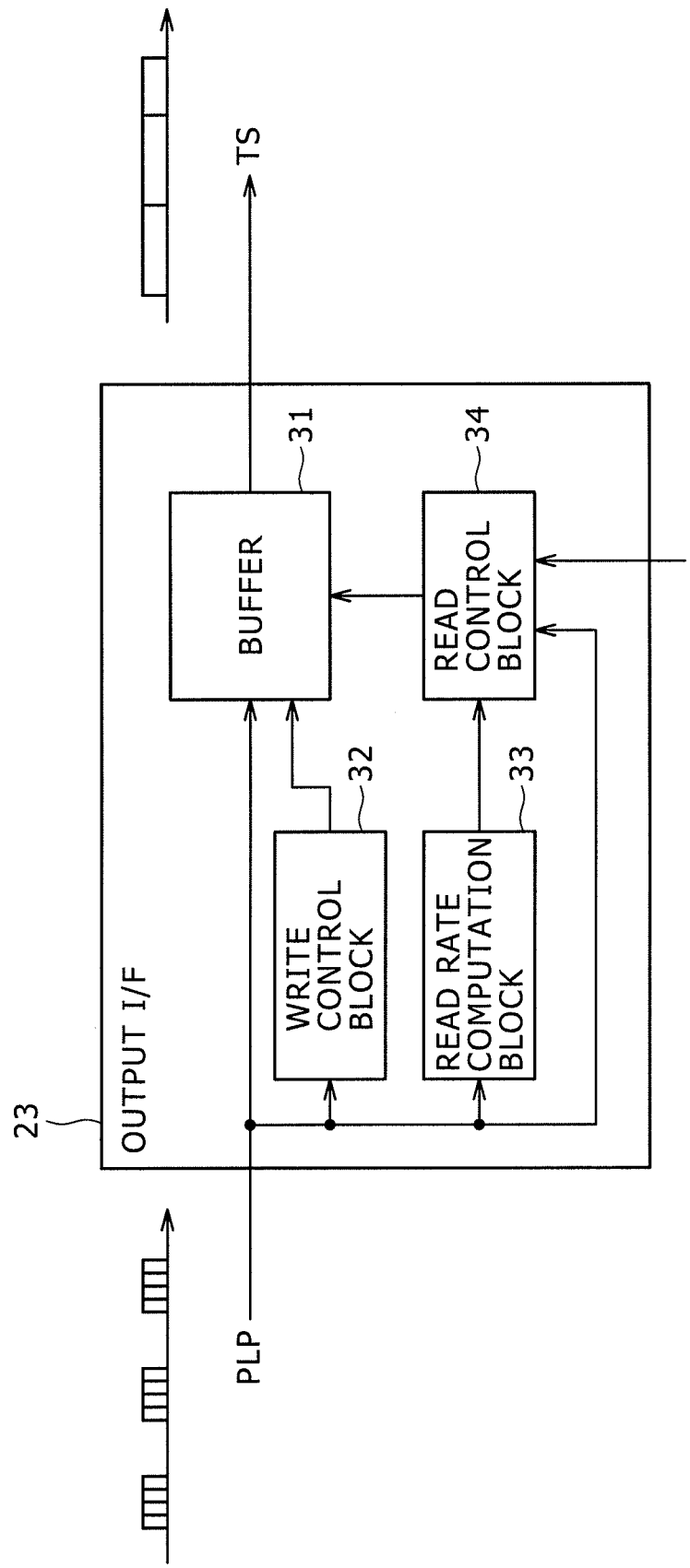
FIG. 3 is a block diagram illustrating a configuration example of an output I/F.

FIG. 3 shows a configuration example of the output I/F 23 shown in FIG. 2.

In the example shown in FIG. 3, the output I/F 23 is configured by a buffer 31, a write control block 32, a read rate computation block 33, and a read control block 34.

The PLPs (common PLP and data PLP) supplied from the error correction unit 22 are supplied to the buffer 31, the write control block 32, the read rate computation block 33, and the read control block 34.

The buffer 31 sequentially stores PLPs supplied from the error correction unit 22 under write control by the write control block 32. In addition, the buffer 31 reads the stored PLPs to reconstruct the TS under read control by the read control block 34, outputting the reconstructed TS to the decoder 14.

On the basis of the PLPs supplied from the error correction unit 22, the write control block 32 executes write address control on the buffer 31, thereby storing the PLPs in the buffer 31.

On the basis of the PLP supplied from the error correction unit 22, the read rate computation block 33 computes a TS rate and supplies the obtained TS rate to the read control block 34. Details of the TS rate computation to be executed by the read rate computation block 33 will be described later with reference to FIGS. 10A and 10B.

To the read control block 34, the delay time computation information is supplied from the demodulation unit 21 shown in FIG. 2 in addition to the PLP from the error correction unit 22 and the TS rate from the read rate computation block 33.

In accordance with the TS rate supplied from the read rate computation block 33, the read control block 34 executes read address control on the buffer 31 such that TS to be reconstructed from the PLP read from the buffer 31 is outputted.

In addition, on the basis of the PLP supplied from the error correction unit 22 and the delay time computation information supplied from the demodulation unit 21, the read control block 34 detects a combination of the common PLP and the data PLP with read timing synchronized for the common PLPs and the data PLPs stored in the buffer 31 and then obtains a predetermined delay time up to the starting of read.

Therefore, after the passing of the predetermined delay time after the detection of the common PLP and the data PLP with read timing synchronized, the read control block 34 starts reading these PLPs and supplies the TS reconstructed by this reading to the decoder 14 in accordance with the TS rate.

It should be noted that details of the operations to be executed by the write control block 32 and the read control block 34 will be descried later with reference to FIG. 11 through FIG. 13C.

[Processing by the Transmitting Apparatus]

The following describes in detail the transmission and reception processing to be executed between the receiving apparatus 1 and the transmitting apparatus 2 with reference to FIG. 4 through FIG. 13C. First, with reference to FIG. 4 through FIG. 6, the processing to be executed by the transmitting apparatus 2 is described. Then, with reference to FIG. 7 through FIG. 13C, the processing to be executed by the receiving apparatus 1 is described.

It should be noted that, in the following description of the transmission and reception processing, four TSs, it is assumed for the brevity of description that TS1 through TS4, be entered in the transmitting apparatus 2, the PLP generated by these TS be error-corrected and OFDM-modulated, and the resultant PLP be transmitted to the receiving apparatus 1.

Figure 4:
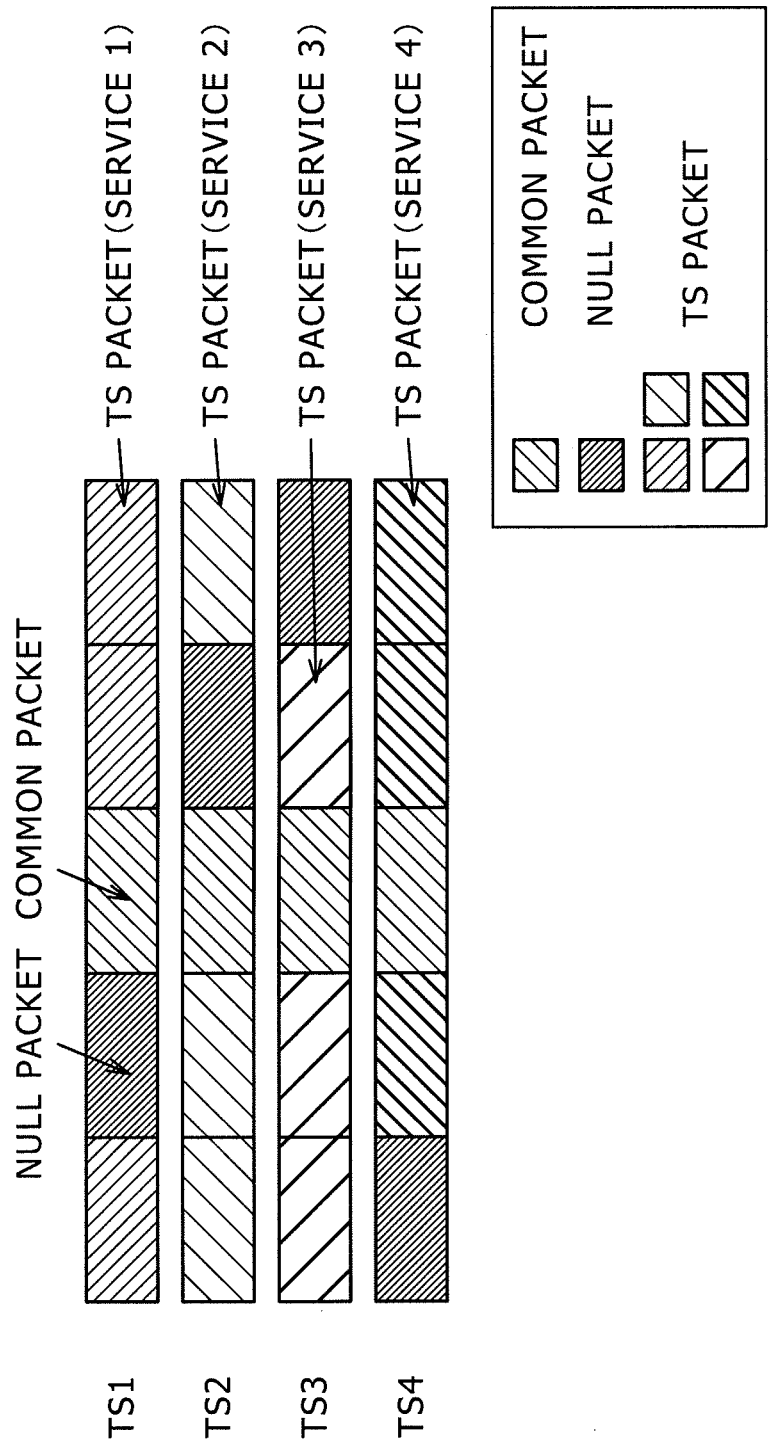
FIG. 4 is a diagram illustrating packet configurations at the transmission side.

As shown in FIG. 4, the five boxes corresponding to TS1 through TS4 are each indicative of a packet. In the present embodiment, the TS packets making up each of these TSs are divided into three types; TS packet, null packet, and common packet.

It should be noted that the TS packet is a packet in which data for providing services (service 1 through service 4 shown in the figure), such as MPEG-encoded data, are provided. A null packet denotes data for adjustment that is transmitted so as to keep constant an information quantity to be outputted from the transmission side when there is no data to be transmitted from the transmission side. For example, the null packet specified by MPEG is a packet with the first four byres of each TS packet being 0x47, 0x1F, 0xFF, and 0x1F; for payload bits, all is are employed, for example.

The common packet is a packet in which the stored data is common to two or more TSs. For example, in the case of MPEG, the control information, such as SDT and EIT described above for example, is this common packet.

That is, in the example shown in FIG. 4, the third packet from the left in the figure of the five packets making up each of TS1 through TS4 is the common packet. These common packets contain the same information, so that these common packets are extracted as a common PLP as shown in FIG. 5.

Figure 5:
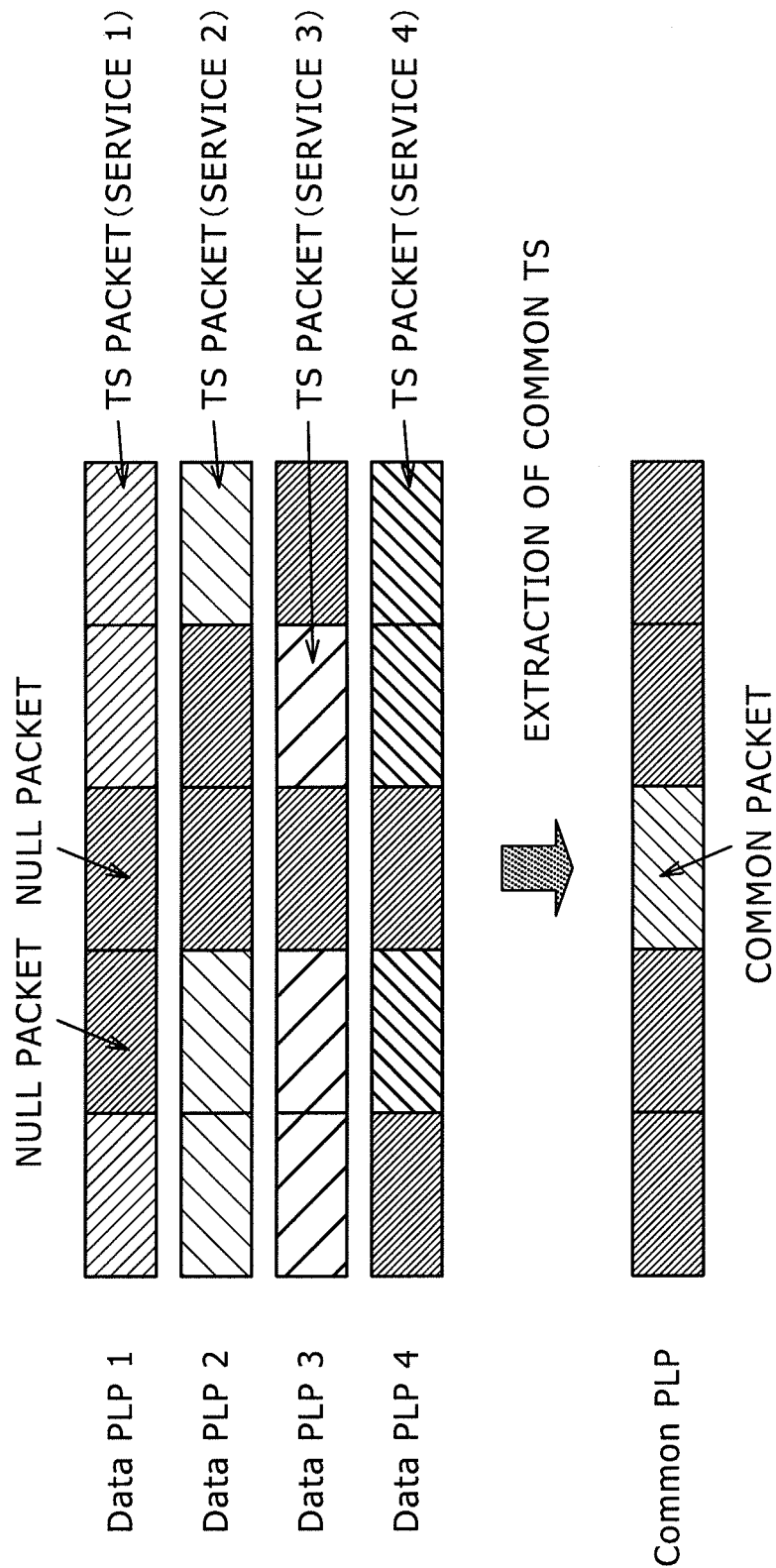
FIG. 5 is a diagram illustrating a configuration example of common PLP and data PLP on the transmission side.

To be more specific, in TS1 through TS4 shown in FIG. 4, the common packets, if any, are extracted as a common PLP as shown in FIG. 5 and the extracted common packets are replaced by null packets. Then, each TS with the common packet extracted becomes a sequence called a data PLP; namely, the TSs become data PLP1 through data PLP4, respectively.

If the transmitting apparatus 2 is operating in the mode called null packet deletion, the null packet is transmitted in a signaling called a 1-byte DNP (Deleted Null Packet).

Figure 6:
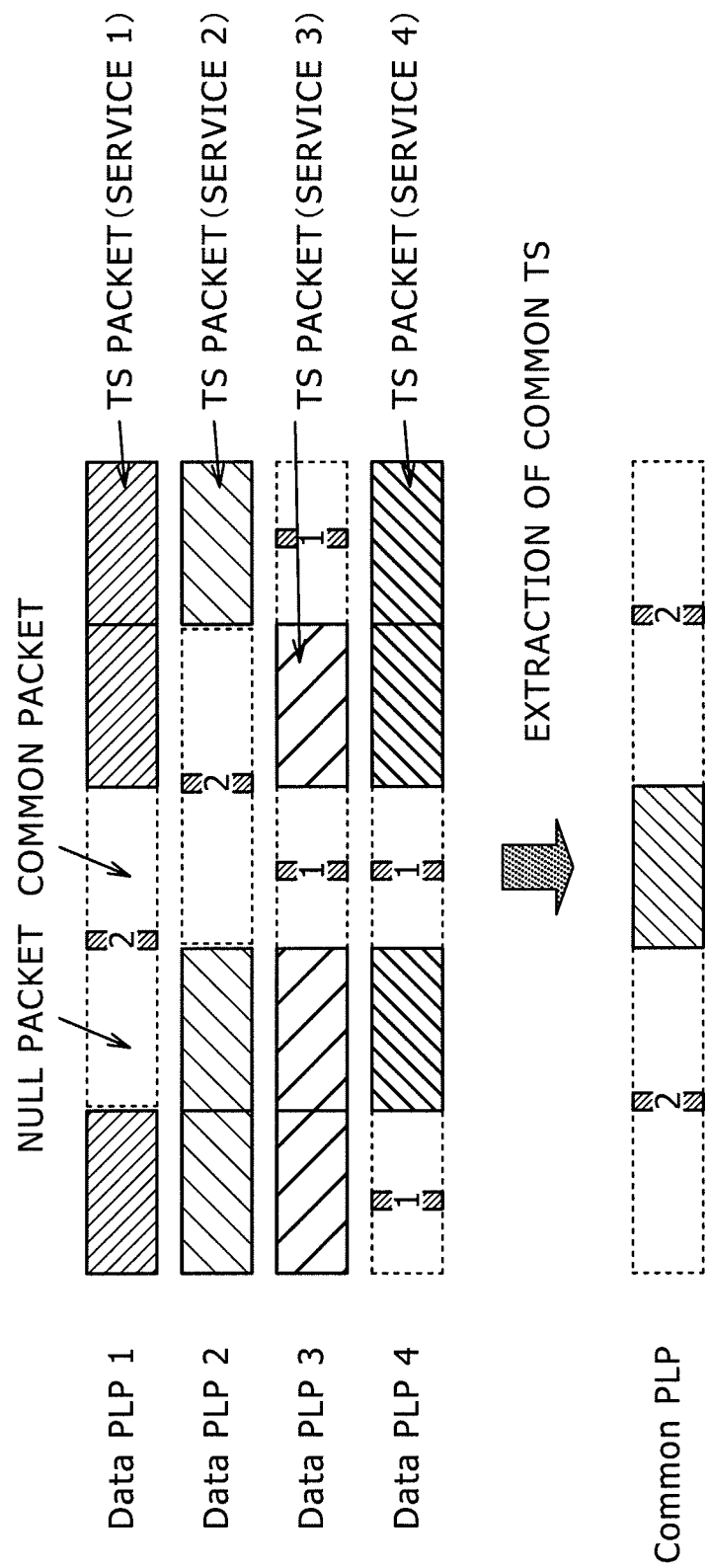
FIG. 6 is a diagram illustrating a configuration example of common PLP and data PLP in the null packet deletion mode on the transmission side.

For example, with data PLP1 shown in FIG. 5, the second and third packets from the left in the figure are null packets; if two null packets continue, these null packets are replaced by a 1-byte signal having value 2 as shown in FIG. 6. Namely, the DNP value corresponds to the number of successive null packets; for example, with data PLP3 shown in FIG. 5, the third and fifth packets from the left in the figure are independently null packets, so that these null packets are each replaced by a 1-byte signal having value 1.

As described above, replacing null packets by a 1-byte DNP provides a state in which data PLP1 through data PLP4 shown in FIG. 5 become as shown in FIG. 6. Consequently, in the transmitting apparatus 2, data PLP1 through data PLP4 and a common PLP have been generated.

Thus, in the transmitting apparatus 2, four data PLPs and one common PLP are generated from four TSs and predetermined processing, such as error correction and OFDM modulation, is executed on these five signals, the resultant OFDM signals being transmitted to the receiving apparatus 1.

[Processing by the Receiving Apparatus]

The following describes the processing to be executed by the receiving apparatus 1 with reference to FIG. 7 through FIG. 13C.

It should be noted that, as described above, an OFDM signal is assumed to have been processed in the error correction and OFDM modulation on data PLP1 through PLP4 and common PLP shown in FIG. 6 in accordance with the processing by the transmitting apparatus 2.

Figure 7:
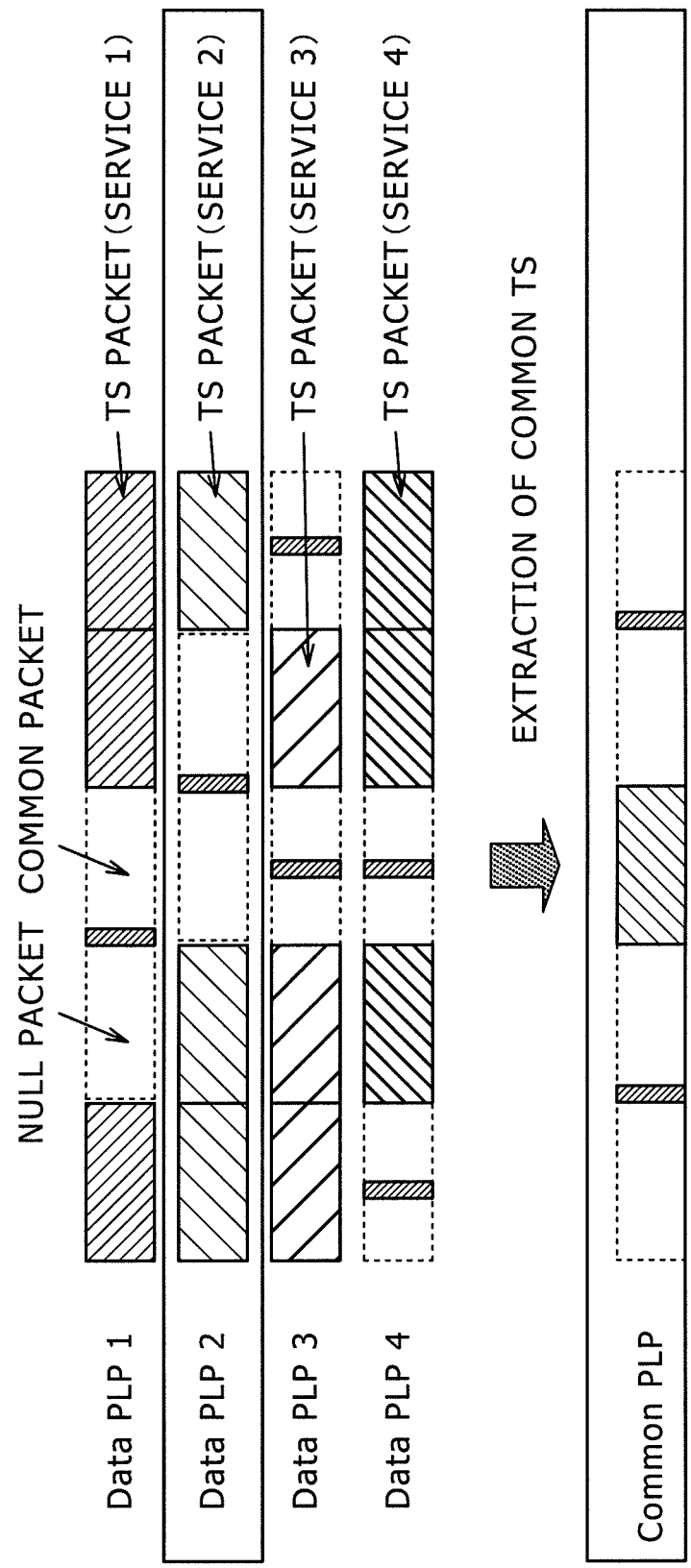
FIG. 7 is a diagram illustrating a configuration example of common PLP and data PLP on the receiving side.

In the receiving apparatus 1, an OFDM signal transmitted from the transmitting apparatus 2 via a predetermined transmission path is received to be processed by the demodulation unit 21 in a predetermined manner, such as OFDM demodulation, thereby providing data PLP1 through PLP4 and a common PLP shown in FIG. 7 that correspond to data PLP1 through PLP4 and common PLP shown in FIG. 6. Then, if service 2 is selected by a user operation, for example, data PLP2 is extracted from data PLP1 through data PLP4 and the extracted data PLP2 and the common PLP are processed by the error correction unit 22 in a predetermined manner, such as error correction, the resultant signals being outputted to the output I/F 23.

Figure 8:
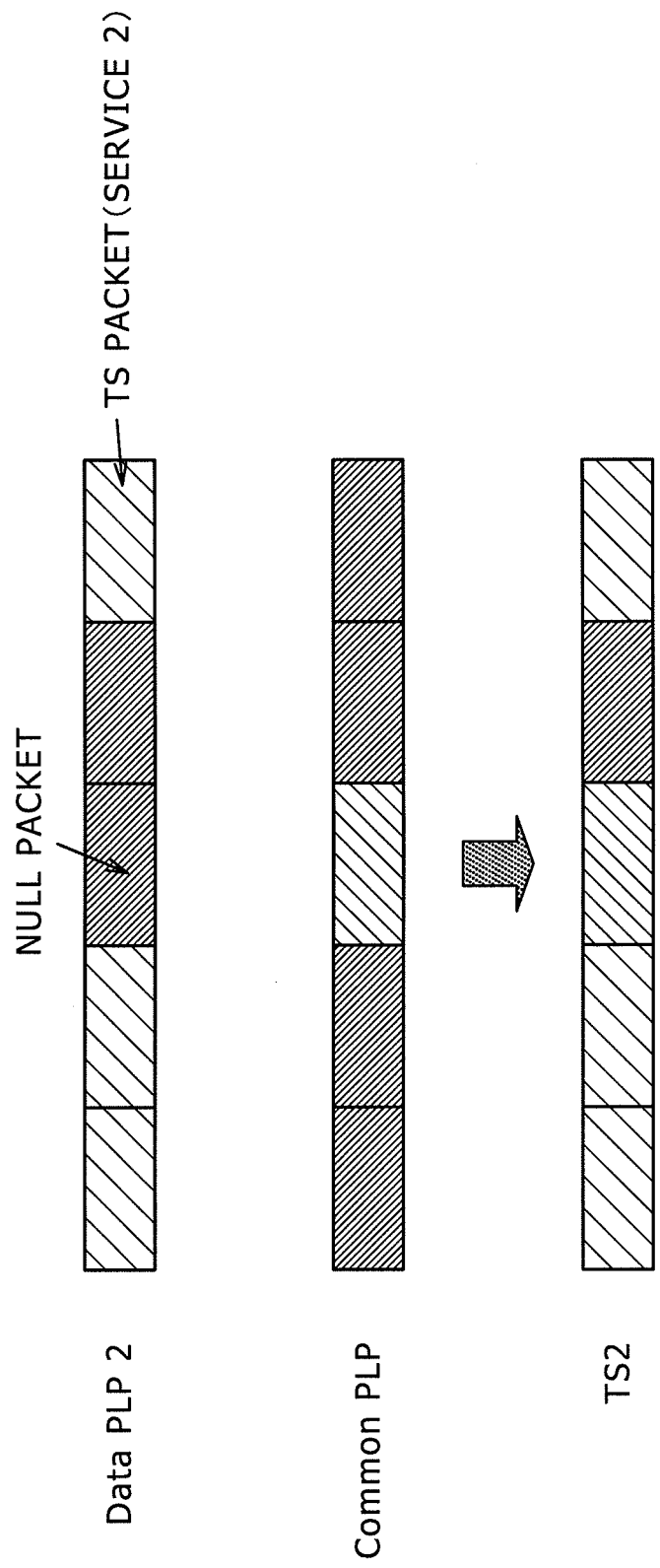
FIG. 8 is a diagram for describing a TS reconstruction method on the receiving side.

To be more specific, only data PLP2 and the common PLP corresponding to data PLP2, both enclosed by thick lines shown in FIG. 7, are entered in the output I/F 23. Then, as shown in FIG. 8, for the entered data PLP 2 and common PLP, the output I/F 23 replaces the null packet arranged in data PLP2 by the common packet arranged in the corresponding common PLP. Consequently, as shown in FIG. 8, the original TS2 similar to the TS2 shown in FIG. 4 is reconstructed.

FIG. 9 shows a diagram for describing details of a desired data PLP (data PLP2) and a common PLP to be entered in the output I/F 23 and a TS to be outputted from the output I/F 23.

As shown in FIG. 9, the data PLP and the common PLP to be entered in the output I/F 23 are attached with information called DNP and ISSY (Input Stream Synchronizer) in units of TS packets.

This ISSY includes information such as ISCR (Input Stream Time Reference), BUFS (Buffer Size) or TTO (Time to Output). ISCR is information indicative of a time stamp that is added on the side of the transmitting apparatus 2 at the time of the transmission of each TS packet. BUFS is information indicative of a required buffer size of PLP. Referencing this information, the receiving apparatus 1 is able to determine a buffer area.

TTO is information indicative of a time from the beginning of a P1 symbol arranged in T2 frame in which processing is executed on a TS packet to the outputting of this TS packet.

DNP is information that is added in the null packet deletion mode as described above, in which successive null packets are transmitted as a signal with the number of continuation being one byte. For example, with the receiving apparatus 1, if DNP=3, the original packet sequence can be reconstructed with three null packets being successive one after the other.

Using these items of information obtained from PLP, the output I/F 23 detects a combination of the two synchronized packets from data PLP and common PLP, thereby providing synchronism by matching the timings of data PLP and common PLP.

To be more specific, in the output I/F 23, the read rate computation block 33 reconstructs the data PLP into the original packet sequence by use of the DNP added to the data PLP to read the ISCR added to the TS packet, thereby obtaining a TS output rate (or a TS rate) by the equation (1) below.

$$\text{Rate} = \frac{\text{N\_bits} \times (\text{N\_packets} + \sum DNP)}{(\text{ISCR\_b} - \text{ISCR\_a}) \times T} \quad (1)$$

It should be noted that, in equation (1) above, N_bits denotes the number of bits per packet, in which 1504 (bits/packet) for example are substituted. T denotes a unit of elementary period, in which a value of 7/64 is substituted in the case of 8 MHz band for example.

Figures 10A, 10B:
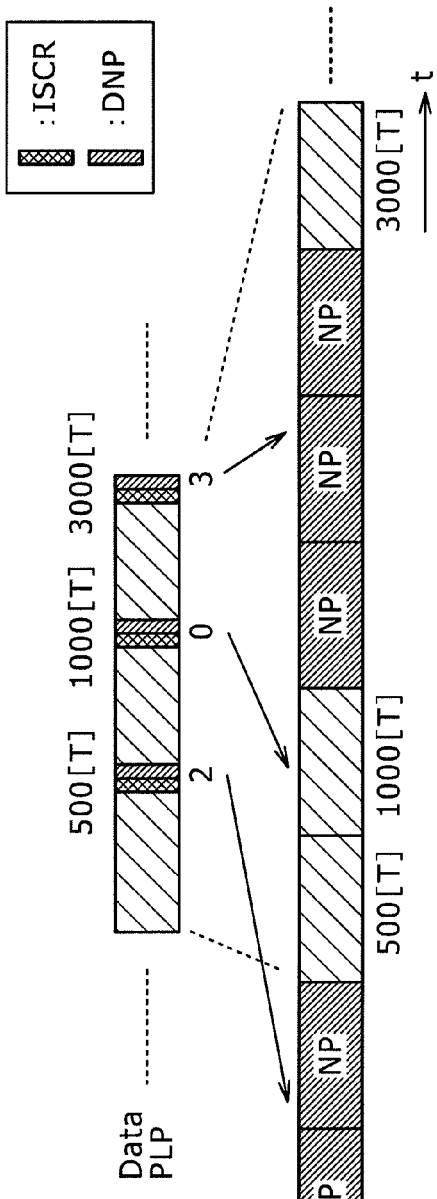
FIG. 10A and FIG. 10B are diagrams illustrating a TS rate computation method.

FIGS. 10A and 10B show diagrams for describing a TS rate computation example that is executed in the read rate computation block 33. It should be noted that, in FIGS. 10A and 10B, time is in the direction from left to right as indicated by the right-going arrow.

In the read rate computation block 33, TS packets are entered as data PLP and DNP and ISCR attached to each TS packet are entered as shown in FIG. 10A. In the case of this example, DNP attached to the first TS packet from the right in the figure is indicative of 3 and ISCR is indicative of 3000[T]. Likewise, DNP of the second TS packet is indicative of 0 and ISCR is indicative of 1000[T]. DNP of the third TS packet is indicative of 2 and ISCR is indicative of 500[T].

When the null packets are reconstructed to the original state by use of these DNPs, the data PLP shown in FIG. 10A become as shown in FIG. 10B. Namely, three null packets are arranged behind the first TS packet, followed by the second and third TS packets, behind which two more null packets are arranged.

Therefore, let the packet rate be $P_{ts}$, then this $P_{ts}$ can be obtained as follows.

$$P_{ts}=(ISCR\_b-ISCR\_b)/(N\_packets+\Sigma DNP)=(3000[T]-500[T])/5[packets]=500[T/packet]$$

Next, let the TS rate be $R_{TS}$, then this $R_{TS}$ can be obtained from equation (1) and $P_{ts}$ shown above as follows.

$$R_{TS}=N\_bits/P_{ts} \times T=1504[bit/packet]/500[T/packet] \times (7/64[\mu s])=27.5[Mbps]$$

$R_{TS}$=27.5[Mbps] thus obtained is supplied to the read control block 34 as a TS rate.

The following describes details of operations of the write control block 32 and the read control block 34 that are executed on the buffer 31 with reference to FIG. 11 through FIG. 13C.

Figure 11:
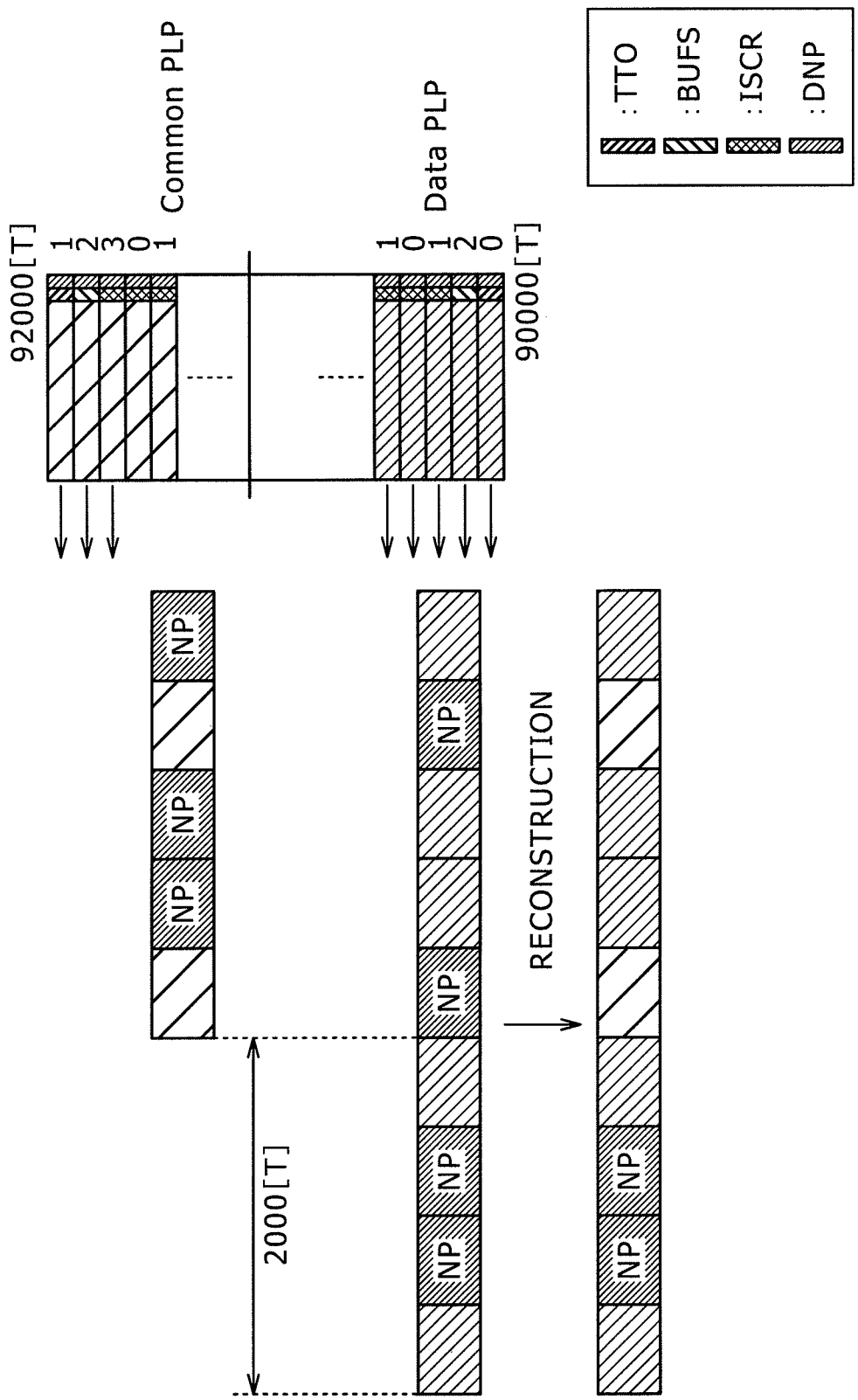
FIG. 11 is a diagram for describing buffer write and read timings.

FIG. 11 shows a schematic diagram for describing timings of read and write operations to be executed on the buffer 31.

In the example shown in FIG. 11, a manner in which PLPs are sequentially stored in the buffer 31 is schematically shown. In this schematic diagram, common PLPs are sequentially stored downward in the upper area and data PLPs are sequentially stored upward in the bottom area.

Namely, in the example shown in FIG. 11, the common PLPs entered in the output I/F 23 are sequentially stored in the buffer 31 under the control of the write control block 32, resultantly storing five common packets into the predetermined upper area in the figure along with the attached ISSY and DNP. As for these ISSY and DNP attached to each common packet, TTO=92000 [T] and DNP=1 are arranged in the start common packet and BUFS and DNP=2 are arranged in the second common packet in this example. The third through fifth common packets, DNP=3, 0, 1 are arranged along with ISCR.

On the other hand, the entered data PLPs are sequentially stored in the buffer 31 under the control of the write control block 32, resultantly storing five TS packets into the predetermined bottom area in the figure along with the attached ISSY and DNP. As for these ISSY and DNP attached to each TS packet, TTO=92000[T] and DNP=0 are arranged in the start TS packet and BUFS and DNP=2 are arranged in the second TS packet in this example. The third through fifth common packets, DNP=1, 0, 1 are arranged along with ISCR. It should be noted that, in the example shown in FIG. 11, specific values are not shown for BUFS and ISCR; actually, however, predetermined values are allocated to these ISSYs like TTO.

As described above, the common PLPs and the data PLPs are stored in the buffer 31. Then, the common PLPs and the data PLPs stored in the buffer 31 are read out under the control of the read control block 34. In the example shown in FIG. 11, the start packet of data PLP is read after 90000[T] from the beginning of P1 symbol by use of the value of TTO and the common packet at the beginning of data PLP is read after 92000[T] from the beginning of P1 symbol, namely, 2000[T] after the reading of the start TS packet of data PLP.

To be more specific, while reading both the common PLP and the data PLP from the buffer 31, the read control block 34 provides a match between the outputting timings of the common PLP and the data PLP by use of TTO. Next, if, for the read PLP, a combination of the common PLP and the data PLP synchronized in read timing is detected, the read control block 34 replaces the null packet arranged in the data PLP by the common packet of the common PLP, thereby reconstructing the original TS.

It should be noted here that, in outputting the common PLP and the data PLP upon synchronization in between, a too early output timing will result the full output of the reconstructed TS before a following frame comes, thereby making it possible to cause a non-output period in the TS output period as described before. If this TS non-output period occurs, it is possible for the decoder 14 to fail decoding.

As described above, in the present embodiment, the reading of PLP is started a predetermined delay time after the detection of a combination of common PLP and data PLP synchronized in read timing by controlling through the read control block 34 the reading of the common PLP and the data PLP stored in the buffer 31, thereby prevent the TS non-output period from happening.

So, the following describes examples of a first prevention method through a third prevention method of preventing the TS non-output period that are executed by the read control block 34.

First, referring to the timing charts shown in FIGS. 12A and 12B, the first TS non-output period prevent method is described.

It should be noted that, for the easy understanding of description, FIG. 12A shows a timing chart in which a TS non-output period occurs and FIG. 12B shows a timing chart in which a TS non-output period does not occur.

It should also be noted that, in each timing charts shown in FIGS. 12A and 12B, the horizontal axis is indicative of time, in which time passes from left to right. The vertical axis is indicative of the address of data that is stored in the buffer 31; the higher the axis, the higher the address. Also, in FIGS. 12A and 12B, dashed lines are indicative of write address and solid lines are indicative of read address. The meaning of these axes is the same as the meaning of the axes shown in FIGS. 13A to 13C to be described later.

In FIGS. 12A and 12B, F_idx is indicative of the index of T2 frame. In the example shown in S. 12A and 12B, T2 frames having F_idx=0, 1, 2, 3, . . . are sequentially entered in the output I/F 23. In addition, as shown in "Data" in the figure, the number of TS packets contained in one T2 frame is the same throughout the frames.

First, the example in which a TS non-output period occurs as shown in FIG. 12A will be described.

As shown in FIG. 12A, in the output I/F 23, when TS packets of T2 frame (F_idx=0) are entered, the storing of the entered TS packets into the buffer 31 is started by the write control block 32 and, at the same time, the reading of TS packets stored in the buffer 31 is started by the read control block 34. At this moment, as shown in FIG. 12A, the inclinations indicative of the speeds of write address and read address are different, so that the TS packets stored in the buffer 31 are read when the storage amount of TS packets reaches a predetermined level.

To be more specific, the read control block 34 reads TS packets asynchronously with the writing of TS packets. In addition, if a combination of common PLP and data PLP synchronized in read timing has been detected, the read control block 34 directly outputs the TS that is reconstructed by replacing the null packet of this data PLP by the common packet of the common PLP. Then, the read control block 34 continues reading TS packets until all the TS packets stored in the buffer 31 have been read after the end of the writing of the TS packets for T2 frame (F_idx=0).

When the reading of the TS packets for T2 frame (F_idx=0) has come to end, the writing and reading of TS packets are executed on T2 frame (F_idx=1) as with T2 frame (F_idx=0). In the example shown in FIGS. 12A and 12B, frames are mixed with jitter, which causes a delay of the frame start of T2 frame (F_idx=2). In this case, T2 frame (F_idx=2) will not be entered after the end of the reading of all TS packets.

Namely, the frame starts of consecutive T2 frames are equidistantly entered and it is a normal input that a total number of packets of T2 frames is always the same. However, in the example shown in FIGS. 12A and 12B, due to the mixture of jigger into frames, the number of packets is the same for each frame, but the interval of the frame starts of T2 frame (F_idx=2) is varying.

When the above-mentioned state is provided, the read address catches up the write address, but, because there is no read data, a TS non-output period occurs.

In the example shown in FIG. 12B, as compared with the example shown in FIG. 12A, the start timing of the reading by the read control block 34 that was started at the same time as the start of the writing by the write control block 32 is delayed by a predetermined delay time. Consequently, in the case shown in FIG. 12B, even if the frame start of T2 frame (F_idx=2) is delayed due to the mixture of jitter in frames, the read address will not catch up the write address, so that the occurrence of a TS non-output period can be prevented.

To be more specific, even if a combination of common PLP and data PLP synchronized in read timing has been detected, the read control block 34 does not start the reading instantly, but start the reading of PLPs after a delay time, such as 10 ms for example, has passed.

This delay time may be set by a user operation through the environment in which the receiving apparatus 1 is used or may be set as a so-called factory shipment set value in which the manufacturer of the receiving apparatus 1 makes settings in accordance with generally expected use environment.

As described above, by delaying the read start timing by a predetermined delay time, such as 10 ms for example, after the detection of a combination of common PLP and data PLP synchronized in with read timing, the occurrence of the TS non-output period can be prevented, thereby allowing the decoder 14 to surely execute decoding.

Figures 13A, 13B, 13C:
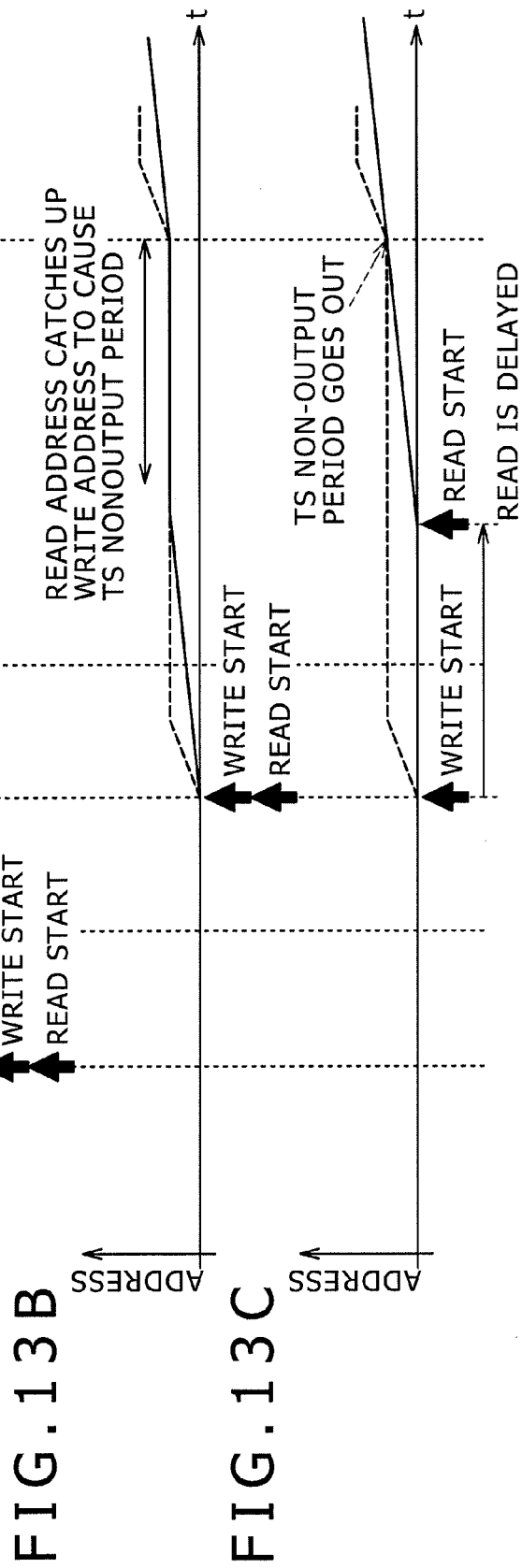
FIG. 13A, FIG. 13B, and FIG. 13C are timing charts indicative of a second prevention method for preventing a TS non-output period.

The following describes the second TS non-output period prevention method with reference to the timing charts shown in FIGS. 13A to 13C.

It should be noted that, in the example shown in FIGS. 13A to 13C, for the easy understanding of description, FIG. 13A and FIG. 13C show timing charts in the case where a TS non-output period does not occur and FIG. 13B shows a timing chart in the case where a TS non-output period occurs.

In FIGS. 13A to 13C, FEF is contained in input data in addition to the T2 frame like the T2 frame shown in FIGS. 12A and 12B. In the output I/F 23, FEF, T2 frame (F_idx=0), T2 frame (F_idx=1), T2 frame (F_idx=2), FEF, T2 frame (F_idx=3), and so on are entered sequentially. Namely, the second prevention method is used when T2 frames are multiplexed with FEF.

The following describes an example in which a TS non-output period will not occur if the start of reading shown in FIG. 13A is not delayed.

As shown in FIG. 13A, if a combination of common PLP and data PLP synchronized in read timing is detected immediately after FEF, the read address will not catch up the write address in a T2 frame where F_idx=0, 1, 2 when the reading by the read control block 34 is started at the same time as the start of writing by the write control block 32. Because the read address catches up the write address at the end of the FEF that is entered next to T2 frame (F_idx=2), no TS non-output period will occur in the case of the example shown in FIG. 13A.

The following describes an example in which the TS non-output period shown in FIG. 13B occurs.

In contrast, as shown in FIG. 13B, if a combination of common PLP and data PLP synchronized in read timing is detected not immediately after FEF, such as at the beginning of T2 frame (F_idx=2) for example, a next FEF period of T2 frame (F_idx=2) is entered without storing enough data in the buffer 31 when the reading by the read control block 34 is started at the same time the writing by the write control block 32 is started, thereby causing the read address to catch up the write address. Therefore, in the case of the example shown in FIG. 13B, a TS non-output period will occur.

The following describes an example in which a TS non-output period shown in FIG. 13C will not occur.

In the example shown in FIG. 13C, if a combination of common PLP and data PLP synchronized in read timing is detected, the read control block 34 does not immediately start reading but starts reading these PLPs after the passing of a delay time obtained from FEF information.

For example, let the length of FEF be FEF_Length and the interval in which FEF is arranged be FEF_Interval, then delay time D is obtained from equation (2) below.

$$D=(\text{Frame\_Index mod FEF\_Interval}) \times \text{FEF\_Length} + \text{offset} \quad (2)$$

It should be noted that, in equation (2) above, the unit of FEF_Length is T[μs] and FEF_Interval is the number of T2 frames arranged between nth FEF and n+1th FEF. As described above, these FEF_Length and FEF_Interval are supplied from the demodulation unit 21 as delay time computation information.

Also, in equation (2) above, a remainder resulting from the division of Frame_index (F_idx) by FEF_Interval is obtained in (Frame_index mod FEF_Interval). From the obtained remainder, a timing with which a combination of common PLP and data PLP has been detected is obtained.

For example, in the example shown in FIGS. 13A to 13C, Frame_index=2 and FEF_Interval=3, so that, if FEF_Length=30 μs, these values a substituted into equation (2) to obtain D=⅔×300=200 μs as a delay time. Namely, the read control block 34 may start reading 200 μs after the starting of writing.

To be more specific, as shown in FIG. 13C, the read control block 34 controls the reading of the common PLP and the data PLP stored in the buffer 31 and, after the detection of a combination of common PLP and data PLP synchronized in read timing, starts reading after 200 μs for example obtained from equation (2) above, thereby reconstructing and outputting the TS.

As described above, if T2 frames and FEF are multiplexed, a read start timing may be delayed by a predetermined delay time obtained from equation (2) above by use of the FEF information such as FED length to prevent a TS non-output period from happening, thereby allowing the decoder 14 to surely executing decoding.

The third TS non-output period prevention method will be described.

Like the first prevention method, the third prevention method will be described with reference to the timing charts shown in FIGS. 12A and 12B. To be more specific, with the third prevention method, like the first prevention method, in order to prevent a TS non-output period from occurring, the read start time by the read control block 34 started at the same time as the write start time by the write control block 32 is delayed; however, unlike the first prevention method, this delay time is obtained by use of a TTO value in the third prevention method.

Namely, as described above, TTO attached to PLP is information indicative of a time from the beginning of a P1 symbol arranged in the T2 frame in which TS packet processing is executed to the outputting of this TS packet. This time is not fully contained in the period of the subject T2 frame but extends over to a next T2 frame (TTO>T2_frame_Length). So, by use of this TTO, delay time D can be obtained from equation (3) below, $$D = TTO - (T2\_frame\_Length/N\_TI) + \text{offset} \quad (3)$$

It should be noted that, in equation (3) above, T2_frame_Length denotes the length of T2 frame (the unit is T[μs]). N_TI denotes the number of time intervals in one T2 frame. Depending on the value of N_TI, the unit of T2 frame processing is divided.

Therefore, if N_TI=1 for example, the processing is executed on a T2 frame basis, so that delay time D is obtained by computing TTO−T2_frame_Length. In addition, TTO contains a delay produced by the preceding processing block. This delay can be specified by T2_frame_Length/N_TI.

Also, as described above, this N_TI is supplied from the demodulation unit 21 as delay time computation information.

To be more specific, as shown in FIG. 12B, the read control block 34 controls the reading of common PLP and data PLP stored in the buffer 31 to start reading after the passing of a delay time obtained from equation (3) above after the detection of a combination of common PLP and data PLP synchronized in read timing, thereby reconstructing and outputting the TS.

As described above, by delaying the read start timing by a predetermined delay time obtained from equation (3) above by use of TTO contained in ISSY attached to each TS packet, a TS non-output period can be prevented from occurring, thereby allowing the decoder 14 to surely execute decoding.

Then, by use of any one of the first prevention method through the third prevention method, the read control block 34 starts reading by delaying the read start timing by a predetermined delay time and outputs the reconstructed TS to the subsequent decoder 14 in accordance with a TS rate supplied from the read rate computation block 33.

As described above, in the present embodiment, the timing of the start of reading is delayed in order to prevent the influence due to the possibility that a gap occurs in a predetermined frame period from one frame (one super frame period composed of two or more T2 frames and FEF for example) after the start of reading, in such cases as a poor output rate accuracy, a inconstant frame interval, presence of FEF, occurrence of a large DNP extending over frames, for example, in the initial stage of the reading of PLPs stored in the buffer 31.

[Description of Demodulation Processing]

Figure 14:
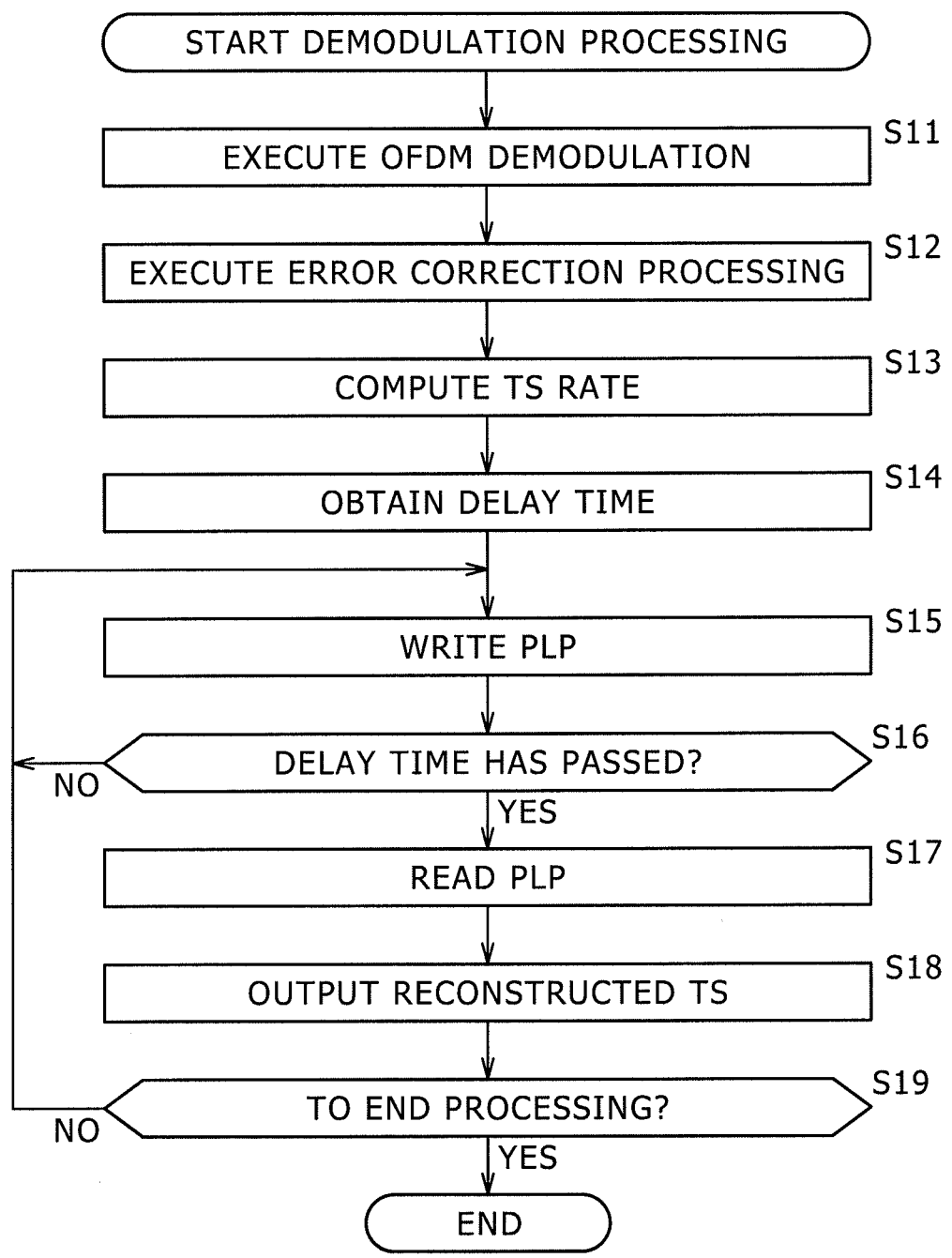
FIG. 14 is a flowchart indicative of demodulation processing.

The following describes the demodulation processing with reference to the flowchart shown in FIG. 14.

The antenna 11 receives an OFDM signal (an RF signal) transmitted from the transmitting apparatus 2 and supplies the received OFDM signal to the acquisition section 12. The acquisition section 12 frequency-converts the OFDM signal received by the antenna 11 into an IF signal and supplies the IF signal to the demodulation unit 21.

In step S11, the demodulation unit 21 executes OFDM demodulation processing on the OFDM signal supplied from the acquisition section 12 and outputs desired data PLPs and one common PLP to the error correction unit 22 as a demodulated signal. Further, the demodulation unit 21 obtains delay time computation information obtained by the demodulation processing and supplies the obtained information to the output I/F 23.

In step S12, the error correction unit 22 executes predetermined error correction processing on the PLP that is a demodulated signal obtained from the demodulation unit 21 and outputs the resultant PLP to the output I/F 23.

In step S13, the read rate computation block 33 computes a TS rate on the basis of the PLP supplied from the error correction unit 22 and supplies the obtained TS rate to the read control block 34.

In step S14, on the basis of the PLP supplied from the error correction unit 22 and delay time computation information supplied from the demodulation unit 21, the read control block 34 obtains a predetermined delay time from the detection of a combination of common PLP and data PLP synchronized in read timing to the start of reading. This delay time can be obtained through any one of the first prevention method through the third prevention method for example described above.

In step S15, on the basis of the PLP supplied from the error correction unit 22, executes write address control on the buffer 31 to store PLPs in the buffer 31.

In step S16, the read control block 34 determines whether the delay time obtained in step S14 has passed from the detection of a combination of common PLP and data PLP synchronized in read timing.

If the delay time is found not having passed in step S16, then the procedure returns to step S15, in which the write control block 32 writes PLPs to the buffer 31 until the delay time passes. Consequently, a certain amount of PLPs are stored in the buffer 31.

On the other hand, if the delay time is found having passed in step S16, then the read control block 34 starts reading PLPs stored in the buffer 31 in step S17. In step S18, the read control block 34 outputs a TS reconstructed by reading PLPs stored in the buffer 31 to the decoder 14 in accordance with a TS rate supplied from the read rate computation block 33.

In step S19, the output I/F 23 determines whether to end the demodulation processing shown in FIG. 14. If the demodulation processing is found not to be ended in step S19, then the procedure returns to step S15 to repeat the above-mentioned processing therefrom.

To be more specific, because the delay time has already passed (always YES in step S16), the processing operations of steps S15, S17, and S18 are repeated, in which the write control block 32 sequentially writes PLPs to the buffer 31 and, at the same time, the read control block 34 sequentially reads PLPs stored in the buffer 31 asynchronously with the writing. Consequently, the reconstructed TSs are sequentially outputted to the decoder 14 at the TS rate. If the writing is not being executed, all PLPs stored in the buffer 31 are read. The PLP reading is continued by the read control block 34 until all PLPs are read and outputted as reconstructed TSs.

In step S20, if the processing is found to be ended, the demodulation processing shown in FIG. 14 comes to an end.

As described above, in the receiving apparatus 1, even if a combination of common PLP and data PLP synchronized in read timing is detected, the reading is not executed immediately, thereby delaying the read start timing by a predetermined delay time.

Consequently, if a combination of common PLP and data PLP synchronized in read timing has been detected and the PLP reading is started immediately after the detection of this combination, the reconstructed TSs will be all outputted before a next frame comes due to various causes described above, thereby possibly causing a TS non-output period. In contrast, in the present embodiment, the reading is started after the passing of a predetermined delay time, so that the occurrence of a TS non-output period can be prevented, thereby preventing the output of TSs to the decoder 14 from being discontinued.

It should be noted that, in the present embodiment, the read control block 34 obtains a delay time through any one of the first prevention method through the third prevention method and starts the reading upon passing of the obtained delay time; however, it also practicable for the read control block 34 to obtain a delay time through another prevention method. Obtaining a delay time through another prevention method requires the read control block 34 to obtain the information for obtaining a delay time; for example, if this information can be obtained by the demodulation unit 21, the demodulation unit 21 may read this information as delay time computation information and supply the delay time computation information to the read control block 34.

Namely, the delay time computation information, such as FEF information and N_TI information, is the information written in the above-mentioned Non-patent Document 1; if the information is other than the above-described delay time computation information and such information is necessary for obtaining a delay time, the read control block 34 is able to obtain a delay time by use of the information other than the above-mentioned delay time computation information.

[Configuration Example of Receiving Systems]

Figure 15:
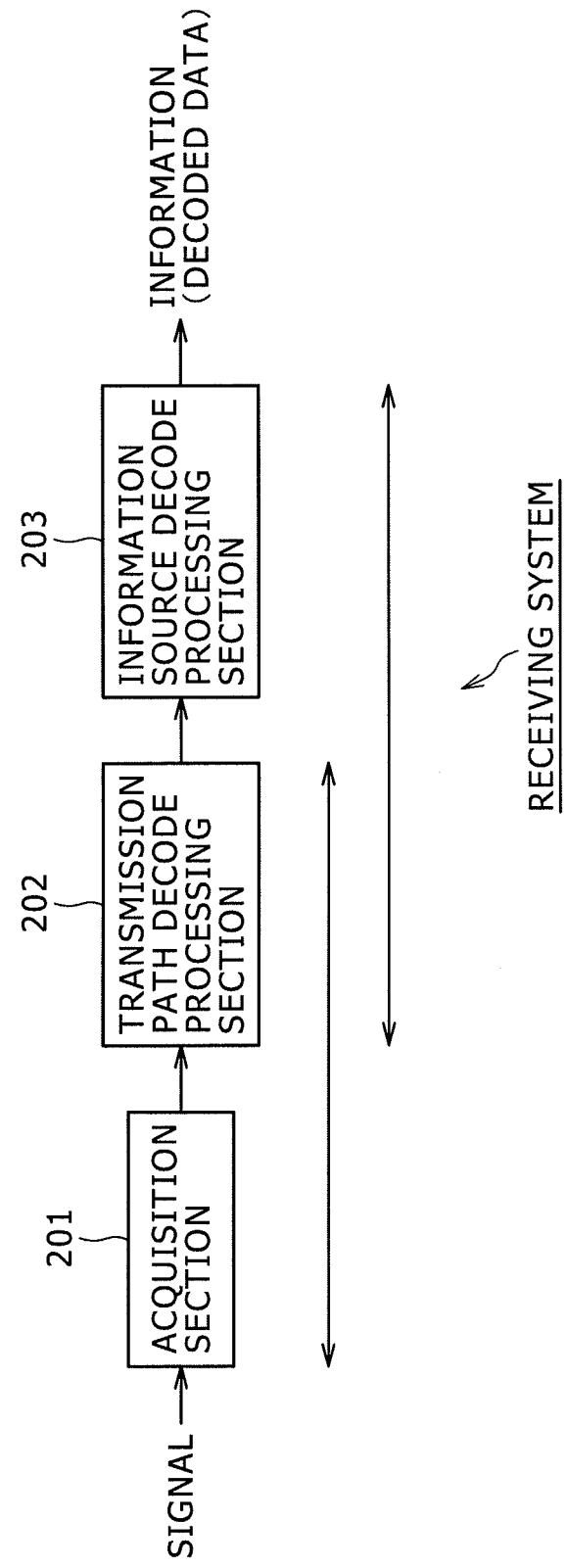
FIG. 15 is a block diagram illustrating a configuration example of a receiving system practiced as a first embodiment of the invention.
Figure 16:
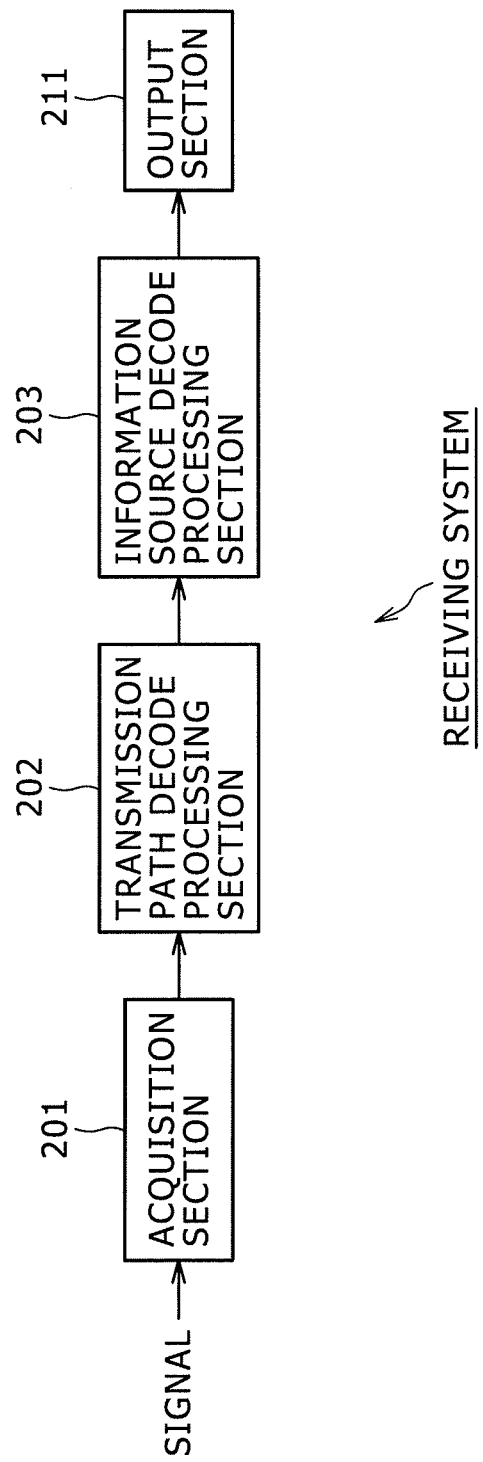
FIG. 16 is a block diagram illustrating a configuration example of a receiving system practiced as a second embodiment of the invention.

The following describes a configuration example of receiving systems with reference to FIG. 15 through FIG. 17.

FIG. 15 shows a configuration example of a receiving system practiced as a first embodiment of the invention.

As shown in FIG. 15, the receiving system is configured by an acquisition section 201, a transmission path decode processing section 202, and an information source decode processing section 203, for example.

The acquisition section 201 obtains signals via transmission paths, not shown, such as terrestrial digital broadcasting, satellite digital broadcasting, a CATV (Cable Television) network, the Internet, and other networks and supplies the received signals to the transmission path decode processing section 202.

If signals are broadcast from a broadcasting station on the terrestrial wave, the satellite wave, or the CATV (Cable Television), for example, the acquisition section 201 is configured by a tuner, an STB (Set-top Box), and so on like the acquisition section 12 shown in FIGS. 12A and 12B. If signals are transmitted from a Web server in a multicast manner like IPTV (Internet Protocol Television), then the acquisition section 201 is configured by a network interface, such as NIC (Network Interface Card) for example.

If signals are broadcast from a broadcasting station on the terrestrial wave, the satellite wave, or the CATV, for example, signals transmitted from two or more transmitting apparatuses via two or more transmission paths are received by one acquisition section 201 as one resultantly synthesized signal.

The transmission path decode processing section 202 estimates a channel for a signal acquired by the acquisition section 201 via a transmission path to execute transmission path decode processing at least including demodulation processing on the acquired signal and supplies a resultant signal to the information source decode processing section 203.

Namely, the signal acquired by the acquisition section 201 via a transmission path is a signal that is distorted by transmission path characteristics, so that the transmission path decode processing section 202 executes demodulation processing, such as transmission path estimation, channel estimation and phase estimation, for example.

In addition, the transmission path decode processing may include the processing of correcting errors that occur on transmission paths, for example. The error correction encoding includes LDPC encoding and Reed-Solomon encoding, for example.

The information source decode processing section 203 executes information source decode processing at least including information decompression processing on the signals on which transmission path decode processing has been executed.

To be more specific, signals acquired by the acquisition section 201 via a transmission path may be information-compressed in order to reduce the amounts of data, such as images and audio as information, for example. In this case, the information source decode processing section 203 executes information source decode processing, such as information decompression processing, on the signals on which transmission path decode processing has been executed.

It should be noted that if a signal acquired by the acquisition section 201 via a transmission path is not compressed, the information source decode processing section 203 does not execute the decompression processing on such a uncompressed signal.

The decompression processing includes MPEG decoding for example. The transmission path decode processing may include descrambling for example, in addition to decompression processing.

With the receiving system configured as described above, the acquisition section 201 executes compression processing, such as MPEG encoding, on image and audio data and acquires error-corrected signals via a transmission path, which are supplied to the transmission path decode processing section 202. At this moment, each signal is acquired in a state distorted by transmission path characteristics.

The transmission path decode processing section 202 executes the same processing as that executed by the transmission path decode processing section 13 shown in FIG. 2 on each signal supplied from the acquisition section 201 as transmission decode processing and supplies a resultant signal to the information source decode processing section 203.

The information source decode processing section 203 executes the same processing as that executed by the decoder 14 shown in FIG. 2 on the signal supplied from the transmission path decode processing section 202 as information source decode processing and outputs resultant image or audio data.

The receiving system configured as shown in FIG. 15 is applicable to television tuners for example for receiving television broadcasting as digital broadcasting, for example.

It should be noted that the acquisition section 201, the transmission path decode processing section 202, and the information source decode processing section 203 may be each configured in one independent apparatus (or hardware unit, such as an IC (Integrated Circuit)), or a software module.

Further, the acquisition section 201, the transmission path decode processing section 202, and the information source decode processing section 203 may be configured as a set of the acquisition section 201 and the transmission path decode processing section 202, a set of the transmission path decode processing section 202 and the information source decode processing section 203, or a set of the acquisition section 201, the transmission path decode processing section 202, and the information source decode processing section 203 as one independent apparatus.

FIG. 16 shows a configuration example of a receiving apparatus practiced as a second embodiment of the invention.

With reference to FIG. 16, components similar to those previously described with reference to FIG. 15 are denoted by the same reference numerals and the description thereof will be appropriately omitted.

The receiving system shown in FIG. 16 is the same as the receiving system shown in FIG. 15 in having an acquisition section 201, a transmission path decode processing section 202, and an information source decode processing section 203, but different in additionally having an output section 211.

The output section 211 is a display apparatus for displaying images or a loudspeaker for outputting sound, for example, and outputs images or sound as a signal outputted from the information source decode processing section 203.

The receiving system configured as described above, is applicable to television receivers for receiving television broadcasting as digital broadcasting and radio receivers for receiving radio broadcasting, for example.

It should be noted that, if a signal acquired by the acquisition section 201 is not compressed, a signal outputted from the transmission path decode processing section 202 is supplied to the output section 211.

FIG. 17 shows a configuration example of a receiving system practiced as a third embodiment of the invention.

With reference to FIG. 17, components similar to those previously described with reference to FIG. 16 are denoted by the same reference numerals and the description thereof will be appropriately omitted.

The receiving system shown in FIG. 17 is the same as the receiving system shown in FIG. 15 in having an acquisition section 201 and a transmission path decode processing section 202.

However, the receiving system shown in FIG. 17 is different from the receiving system shown in FIG. 15 in that the information source decode processing section 203 is not arranged and a recoding section 221 is arranged.

The recording block 221 records (or stores) signals (TS packets of MPEG TS for example) outputted from the transmission path decode processing section 202 to a recording (or storage) medium, such as an optical disk, a hard disk (or magnetic disk), and a flash memory, for example.

The receiving system configured as described above is applicable to recorders for recording television broadcasting, for example.

It should be noted that, in FIG. 17, the receiving system may be configured by arranging an information source decode processing section 203, in which the information source decode processing section 203 records signals on which information source decode processing has been executed, namely, the image and audio data obtained by decoding, to the recording block 221.

The above-mentioned sequence of processing operations may be executed by software as well as hardware. When the above-mentioned sequence of processing operations is executed by software, the programs constituting the software are installed in a computer which is built in dedicated hardware equipment or installed, into a general-purpose personal computer for example in which various programs may be installed for the execution of various functions.

FIG. 18 shows an example of hardware configuration of a computer configured to execute the above-mentioned sequence of processing operations by software.

In the computer shown in FIG. 18, a CPU (Central Processing Unit) 401, a ROM (Read Only Memory) 402, and a RAM (Random Access Memory) are interconnected with a bus 404.

The bus 404 is further connected with an input/output interface 405. The input/output interface 405 is connected with an input section 406, an output section 407, a storage section 408, a communication section 409, and a drive 410.

The input section 406 is configured by a keyboard, a mouse, and a microphone, for example. The output section 407 is configured by a display monitor and a loudspeaker, for example. The storage section 408 is configured by a hard disk drive or a nonvolatile memory, for example. The communication section 409 is configured by a network interface for example. The drive 410 is configured to drive a removable medium 411, such as a magnetic disk, an optical disk, a magneto-optical disk, or a semiconductor memory, for example.

In the computer configured as described above, the CPU 401 executes loads a program from the storage section 408 into the RAM 403 via the input/output interface 405 and the bus 404 to execute the loaded program, thereby executing the above-mentioned sequence of processing operations.

Programs to be executed by the computer may be provided as recorded to the removable medium 411 that is a package medium for example. Alternatively, programs may be provided through wired or wireless transmission medium, such as a local area network, the Internet, or digital broadcasting, for example.

In the above-mentioned computer, programs may be installed into the storage section 408 through the input/output interface 405 by loading the removable medium 411 onto the drive 410. Alternatively, programs may be received at the communication section 409 via wired or wireless transmission medium and installed in the storage section 408. Still alternatively, programs may be stored in the ROM 402 or the storage section 408 in advance.

It should be noted herein that the steps for describing each program recorded in recording medium include not only the processing operations which are sequentially executed in a time-dependent manner but also the processing operations which are executed concurrently or discretely.

It should also be noted that term "system" as used herein denotes an entire apparatus configured by a plurality of component units.

The present application contains subject matter related to that disclosed in Japanese Priority Patent Application JP 2009-187946 filed in the Japan Patent Office on Aug. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving apparatus comprising:
    a buffer configured to store packets of a first packet sequence made up of packets extracted from one transport stream that are common to packets of another transport stream and packets of a second packet sequence made up of common packets;
    read control circuitry configured to read the packets of said first packet sequence and said second packet sequence stored in said buffer after the passing of a predetermined time after synchronization is established between said packets of said first packet sequence and said packets of said second packet sequence, thereby reconstructing one transport stream from said first packet sequence and said second packet sequence;
    demodulation circuitry configured to perform demodulation processing on the packets and to output the demodulated packets as a demodulated signal, the demodulated signal including a demodulation of the first packet sequence and the second packet sequence;
    error correction circuitry configured to perform predetermined error correction processing on the demodulated signal, and to provide the demodulated signal to the read control circuitry; and output circuitry configured to output the reconstructed transport stream, wherein, after the passing of a delay time obtained from information associated with a future extension frame having a structure different from a T2 frame that is a unit in which data is transmitted on the basis of Digital Video Broadcasting-Terrestrial 2, said read control circuitry starts reading packets from said buffer, thereby reconstructing said transport stream, wherein the information associated with the future extension frame includes a length of the future extension frame and an interval of the future extension frame both being provided to the read control circuitry by demodulation circuitry, the interval of the future extension frame being based on a number of T2 frames arranged between an nth future extension frame and an n+1th future extension frame, and a remainder resulting from division of an index number of one of the number of T2 frames by the interval of the future extension frame.

2. The receiving apparatus according to claim 1, wherein said first packet sequence and said second packet sequence are a common physical layer pipe and a data physical layer pipe generated from a plurality of transport streams by a multiple-physical layer pipe in digital video broadcasting-Terrestrial 2.

3. The receiving apparatus according to claim 1, wherein, after the passing of a delay time obtained from Time To Output indicative of a time from the beginning of a P1 symbol arranged in a T2 frame that is a unit in which data is transmitted on the basis of Digital Video Broadcasting-Terrestrial 2 to the outputting of a predetermined packet, said read control circuitry starts reading packets from said buffer, thereby reconstructing said transport stream.

4. A receiving method for a receiving apparatus having a buffer for storing packets of a first packet sequence made up of packets extracted from one transport stream that are common to packets of another transport stream and packets of a second packet sequence made up of common packets, said receiving method comprising:

reading, using read control circuitry, packets of said first packet sequence and said second packet sequence from said buffer after the passing of a predetermined delay time after synchronization between said packets, thereby reconstructing one transport stream from said first packet sequence and said second packet sequence;

demodulation processing, using demodulation circuitry, on the packets and outputting the demodulated packets as a demodulated signal, the demodulated signal including a demodulation of the first packet sequence and the second packet sequence;

predetermined error correction processing, using error correction circuitry, on the demodulated signal and providing the demodulated signal to the read control circuitry;

outputting, using circuitry, the reconstructed transport stream; and after the passing of a delay time obtained from information associated with a future extension frame having a structure different from a T2 frame that is a unit in which data is transmitted on the basis of Digital Video Broadcasting-Terrestrial 2, starting reading, using the read control circuitry, packets from said buffer, thereby reconstructing said transport stream, wherein the information associated with the future extension frame includes a length of the future extension frame and an interval of the future extension frame both being provided to the read control circuitry by demodulation circuitry, the interval of the future extension frame being based on a number of T2 frames arranged between an nth future extension frame and an n+1th future extension frame, and a remainder resulting from division of an index number of one of the number of T2 frames by the interval of the future extension frame.

5. A program stored on a non-transitory computer readable medium having code components, which when executed cause circuitry to:

control a device having a buffer for storing packets of a first packet sequence made up of packets extracted from one transport stream that are common to packets of another transport stream and packets of a second packet sequence made up of common packets;

read packets of said first packet sequence and said second packet sequence from said buffer after the passing of a predetermined delay time after synchronization between said packets, thereby reconstructing one transport stream from said first packet sequence and said second packet sequence;

demodulate the packets and output the demodulated packets as a demodulated signal, the demodulated signal including a demodulation of the first packet sequence and the second packet sequence;

perform predetermined error correction processing on the demodulated signal and provide the demodulated signal to the read control circuitry;

output the reconstructed transport stream; and after the passing of a delay time obtained from information associated with a future extension frame having a structure different from a T2 frame that is a unit in which data is transmitted on the basis of Digital Video Broadcasting-Terrestrial 2, start reading packets from said buffer, thereby reconstructing said transport stream, wherein the information associated with the future extension frame includes a length of the future extension frame and an interval of the future extension frame, the interval of the future extension frame being based on a number of T2 frames arranged between an nth future extension frame and an n+1th future extension frame, and a remainder resulting from division of an index number of one of the number of T2 frames by the interval of the future extension frame.

6. A receiving system, comprising:

acquisition circuitry configured to acquire a signal via a transmission path; and transmission path decode processing circuitry configured to execute transmission path decode processing at least including demodulation processing on a signal acquired via said transmission path, said transmission path decode processing circuitry having a buffer configured to store packets of a first packet sequence made up of packets extracted from one transport stream that are common to packets of another transport stream and packets of a second packet sequence made up of common packets;

read control circuitry configured to read the packets of said first packet sequence and said second packet sequence stored in said buffer after the passing of a predetermined time after synchronization is established between said packets of said first packet sequence and said packets of said second packet sequence, thereby reconstructing one transport stream from said first packet sequence and said second packet sequence;
demodulation circuitry configured to perform the demodulation processing on the signal and to output a demodulated signal, the demodulated signal including a demodulation of the first packet sequence and the second packet sequence;
error correction circuitry configured to perform predetermined error correction processing on the demodulated signal, and to provide the demodulated signal to the read control circuitry; and
output circuitry configured to output the reconstructed transport stream,
wherein, after the passing of a delay time obtained from information associated with a future extension frame having a structure different from a T2 frame that is a unit in which data is transmitted on the basis of Digital Video Broadcasting-Terrestrial 2, said read control circuitry starts reading packets from said buffer, thereby reconstructing said transport stream,
wherein the information associated with the future extension frame includes
a length of the future extension frame and an interval of the future extension frame both being provided to the read control circuitry by demodulation circuitry, the interval of the future extension frame being based on a number of T2 frames arranged between an nth future extension frame and an n+1th future extension frame, and
a remainder resulting from division of an index number of one of the number of T2 frames by the interval of the future extension frame.

7. A receiving system comprising:
transmission path decode processing circuitry configured to execute transmission path decode processing at least including demodulation processing on a signal acquired via a transmission path; and
information source decode processing circuitry configured to execute information source decode processing at least including processing of decompressing compressed information on the signal on which said transmission path decode processing has been executed,
said transmission path decode processing circuitry having
a buffer configured to store packets of a first packet sequence made up of packets extracted from one transport stream that are common to packets of another transport stream and packets of a second packet sequence made up of common packets;
read control circuitry configured to read the packets of said first packet sequence and said second packet sequence stored in said buffer after the passing of a predetermined time after synchronization is established between said packets of said first packet sequence and said packets of said second packet sequence, thereby reconstructing one transport stream from said first packet sequence and said second packet sequence;
demodulation circuitry configured to perform the demodulation processing on the signal and to output a demodulated signal, the demodulated signal including a demodulation of the first packet sequence and the second packet sequence;
error correction circuitry configured to perform predetermined error correction processing on the demodulated signal, and to provide the demodulated signal to the read control circuitry; and
output circuitry configured to output the reconstructed transport stream,
wherein, after the passing of a delay time obtained from information associated with a future extension frame having a structure different from a T2 frame that is a unit in which data is transmitted on the basis of Digital Video Broadcasting-Terrestrial 2, said read control circuitry starts reading packets from said buffer, thereby reconstructing said transport stream,
wherein the information associated with the future extension frame includes
a length of the future extension frame and an interval of the future extension frame both being provided to the read control circuitry by demodulation circuitry, the interval of the future extension frame being based on a number of T2 frames arranged between an nth future extension frame and an n+1th future extension frame, and
a remainder resulting from division of an index number of one of the number of T2 frames by the interval of the future extension frame.

8. A receiving system, comprising:
transmission path decode processing circuitry configured to execute transmission path decode processing at least including demodulation processing on a signal acquired via a transmission path; and
output circuitry configured to output at least one of image data and audio data on the basis of the signal on which said transmission path decode processing has been executed,
said transmission path decode processing circuitry having
a buffer configured to store packets of a first packet sequence made up of packets extracted from one transport stream that are common to packets of another transport stream and packets of a second packet sequence made up of common packets;
read control circuitry configured to read the packets of said first packet sequence and said second packet sequence stored in said buffer after the passing of a predetermined time after synchronization is established between said packets of said first packet sequence and said packets of said second packet sequence, thereby reconstructing one transport stream from said first packet sequence and said second packet sequence;
demodulation circuitry configured to perform the demodulation processing on the signal and to output a demodulated signal, the demodulated signal including a demodulation of the first packet sequence and the second packet sequence;
error correction circuitry configured to perform predetermined error correction processing on the demodulated signal, and to provide the demodulated signal to the read control circuitry; and
transmission path decode output circuitry configured to output the reconstructed transport stream,
wherein, after the passing of a delay time obtained from information associated with a future extension frame having a structure different from a T2 frame that is a unit in which data is transmitted on the basis of Digital Video Broadcasting-Terrestrial 2, said read control circuitry starts reading packets from said buffer, thereby reconstructing said transport stream, wherein the information associated with the future extension frame includes
a length of the future extension frame and an interval of the future extension frame both being provided to the read control circuitry by demodulation circuitry, the interval of the future extension frame being based on a number of T2 frames arranged between an nth future extension frame and an n+1th future extension frame, and
a remainder resulting from division of an index number of one of the number of T2 frames by the interval of the future extension frame.

9. A receiving system, comprising:
transmission path decode processing circuitry configured to execute transmission path decode processing at least including demodulation processing on a signal acquired via a transmission path; and
recording block circuitry configured to record the signal on which said transmission path decode processing has been executed onto a non-transitory computer readable storage medium,
said transmission path decode processing circuitry having
a buffer configured to store packets of a first packet sequence made up of packets extracted from one transport stream that are common to packets of another transport stream and packets of a second packet sequence made up of common packets;
read control circuitry configured to read the packets of said first packet sequence and said second packet sequence stored in said buffer after the passing of a predetermined time after synchronization is established between said packets of said first packet sequence and said packets of said second packet sequence, thereby reconstructing one transport stream from said first packet sequence and said second packet sequence;
demodulation circuitry configured to perform the demodulation processing on the signal and to output a demodulated signal, the demodulated signal including a demodulation of the first packet sequence and the second packet sequence;
error correction circuitry configured to perform predetermined error correction processing on the demodulated signal, and to provide the demodulated signal to the read control circuitry; and
output circuitry configured to output the reconstructed transport stream,
wherein, after the passing of a delay time obtained from information associated with a future extension frame having a structure different from a T2 frame that is a unit in which data is transmitted on the basis of Digital Video Broadcasting-Terrestrial 2, said read control circuitry starts reading packets from said buffer, thereby reconstructing said transport stream,
wherein the information associated with the future extension frame includes
a length of the future extension frame and an interval of the future extension frame both being provided to the read control circuitry by demodulation circuitry, the interval of the future extension frame being based on a number of T2 frames arranged between an nth future extension frame and an n+1th future extension frame, and
a remainder resulting from division of an index number of one of the number of T2 frames by the interval of the future extension frame.

* * * * *